(12) United States Patent
Boothroyd

(10) Patent No.: US 7,926,949 B1
(45) Date of Patent: Apr. 19, 2011

(54) DUAL-MODE THREE-DIMENSIONAL PROJECTION DISPLAY

(75) Inventor: Simon Andrew Boothroyd, Ottawa (CA)

(73) Assignee: Simon Boothroyd, Ottawa, ON (CA)

( * ) Notice: Subject to any disclaimer, the term of this patent is extended or adjusted under 35 U.S.C. 154(b) by 857 days.

(21) Appl. No.: 11/780,910

(22) Filed: Jul. 20, 2007

Related U.S. Application Data

(60) Provisional application No. 60/820,107, filed on Jul. 22, 2006.

(51) Int. Cl.
*G03B 21/00* (2006.01)
*G02B 27/26* (2006.01)

(52) U.S. Cl. .......................................... 353/8; 359/465
(58) Field of Classification Search .................... 353/20, 353/7, 8, 6, 10, 122; 348/42, 51, 52, 54–60, 348/E15.001, E13.003, E13.004, E13.009, 348/E13.005, 743, E9.027, 758; 345/32, 345/88; 250/208.1, 205, 216, 225, 226; 352/57–65, 352/239; 359/462–477, 497; 349/15, 9, 349/8, 5

See application file for complete search history.

(56) References Cited

U.S. PATENT DOCUMENTS

| | | | |
|---|---|---|---|
| 2,958,258 A | | 11/1960 | Kelly |
| 4,647,966 A | | 3/1987 | Phillips et al. |
| 5,121,983 A | | 6/1992 | Lee |
| 5,365,370 A | * | 11/1994 | Hudgins ........................ 359/464 |
| 5,517,340 A | | 5/1996 | Doany et al. |
| 5,726,800 A | * | 3/1998 | Ezra et al. ..................... 359/466 |
| 5,921,650 A | * | 7/1999 | Doany et al. .................... 353/31 |
| 5,982,541 A | * | 11/1999 | Li et al. .......................... 359/497 |
| 6,650,377 B2 | | 11/2003 | Robinson et al. |
| 6,857,748 B2 | * | 2/2005 | Roddy et al. .................... 353/31 |
| 6,961,045 B2 | * | 11/2005 | Tsao .............................. 345/103 |
| 6,962,414 B2 | * | 11/2005 | Roth .............................. 353/20 |
| 6,995,738 B2 | | 2/2006 | Florence |
| 7,059,728 B2 | * | 6/2006 | Alasaarela et al. ............. 353/94 |
| 2002/0190922 A1 | | 12/2002 | Tsao |
| 2003/0020809 A1 | * | 1/2003 | Gibbon et al. .................. 348/51 |
| 2006/0152679 A1 | * | 7/2006 | Kim et al. ....................... 353/10 |

* cited by examiner

*Primary Examiner* — Georgia Y Epps
*Assistant Examiner* — Jennifer Bennett
(74) *Attorney, Agent, or Firm* — Marks & Clerk; Richard J. Mitchell

(57) ABSTRACT

A dual-mode stereoscopic three-dimensional (3D) projection display with two micro-display panels is provided. In a passive 3D mode, the 3D projection display simultaneously projects left-eye and right-eye images with first and second polarizations on the screen. The first and second polarizations are orthogonal to each other. In a first passive mode, a polarization-preserving screen is used and passive polarizing glasses can be worn to see the 3D images. In a second passive mode, an ordinary screen is used and 3D color filter glasses can be worn to see the 3D images. In an active mode, the display projects left-eye and right-eye images, with both first and second polarizations, time-sequentially and liquid crystal shutter glasses synchronized with the image sources can be worn to see 3D images. The dual-mode 3D projection display can be switched electronically to project 2D images when the same 2D image signals are fed to both micro-display panels. The dual-mode 3D projection display is more light efficient than conventional single panel projection displays because at any given time, at least two primary colors are displayed on screen with orthogonal polarizations.

26 Claims, 22 Drawing Sheets

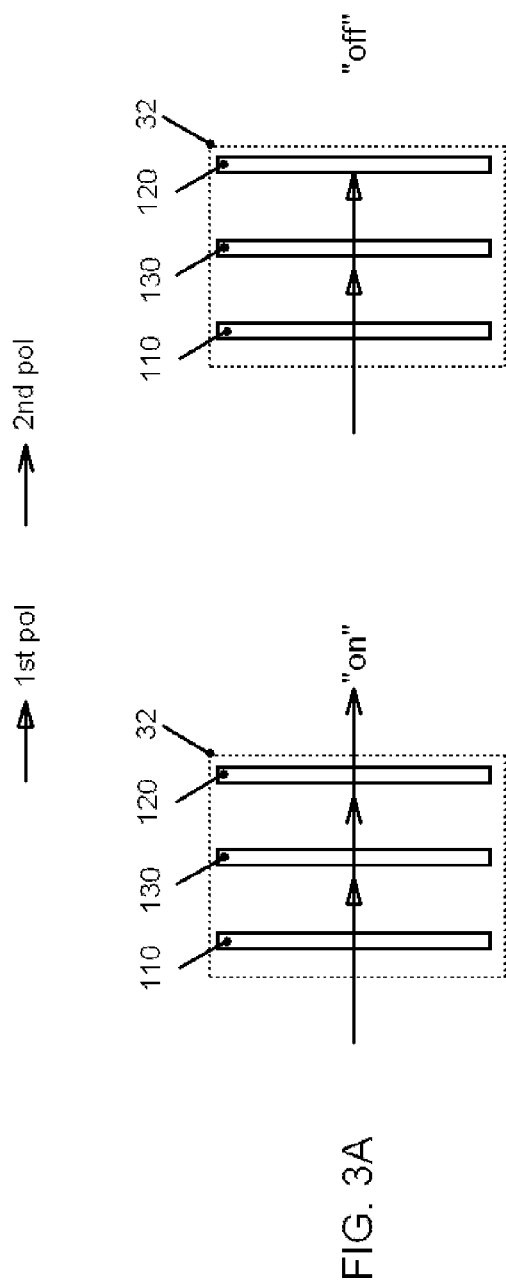
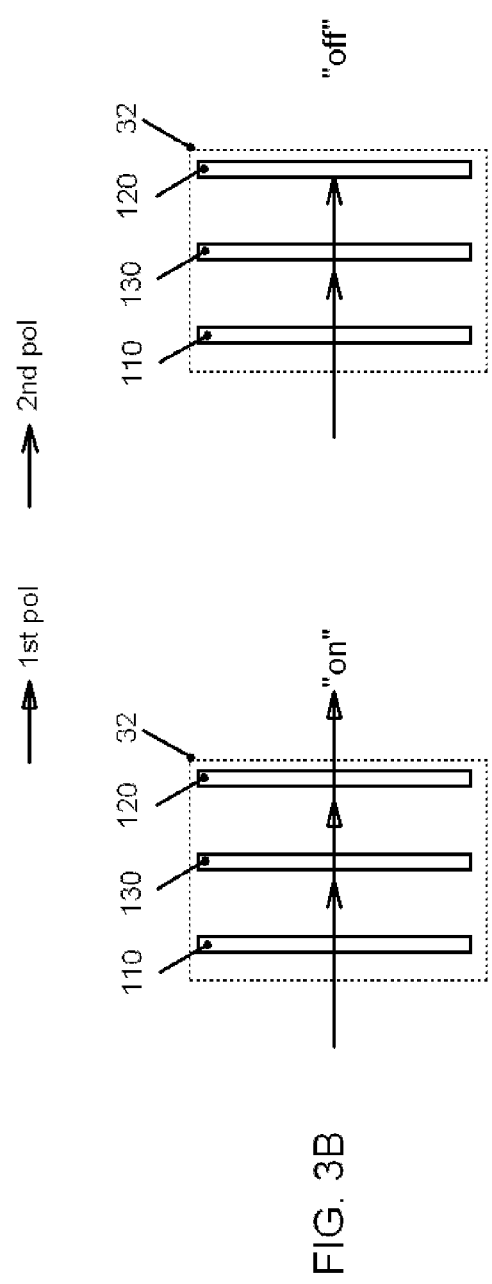
FIG. 3A
FIG. 3B

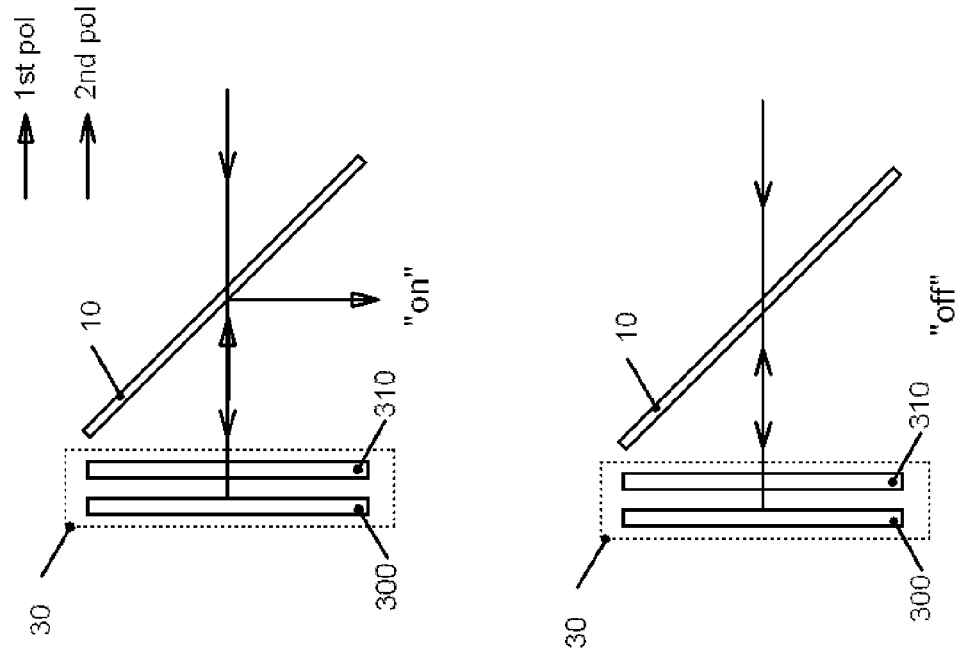
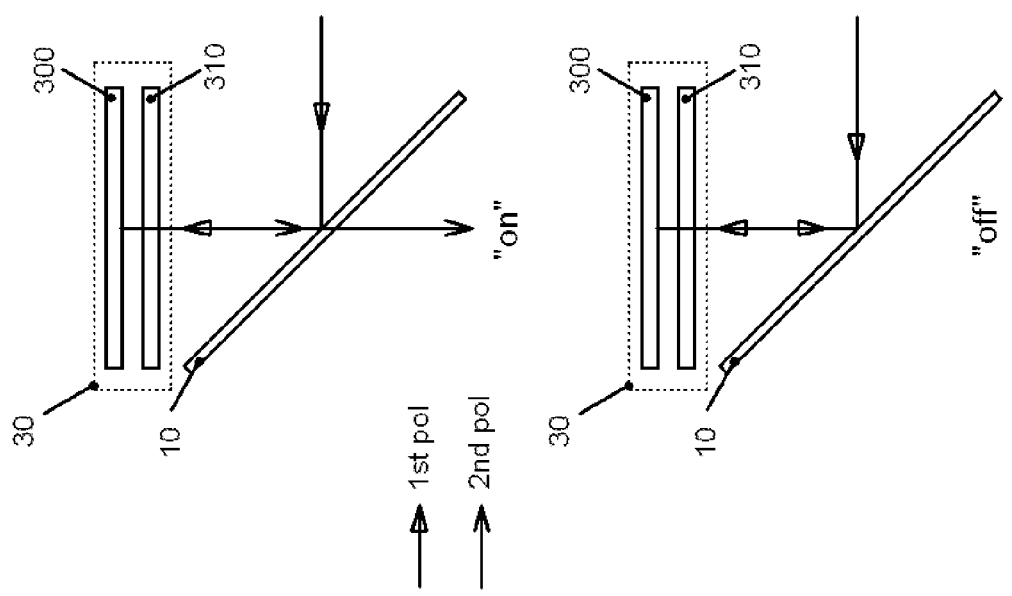

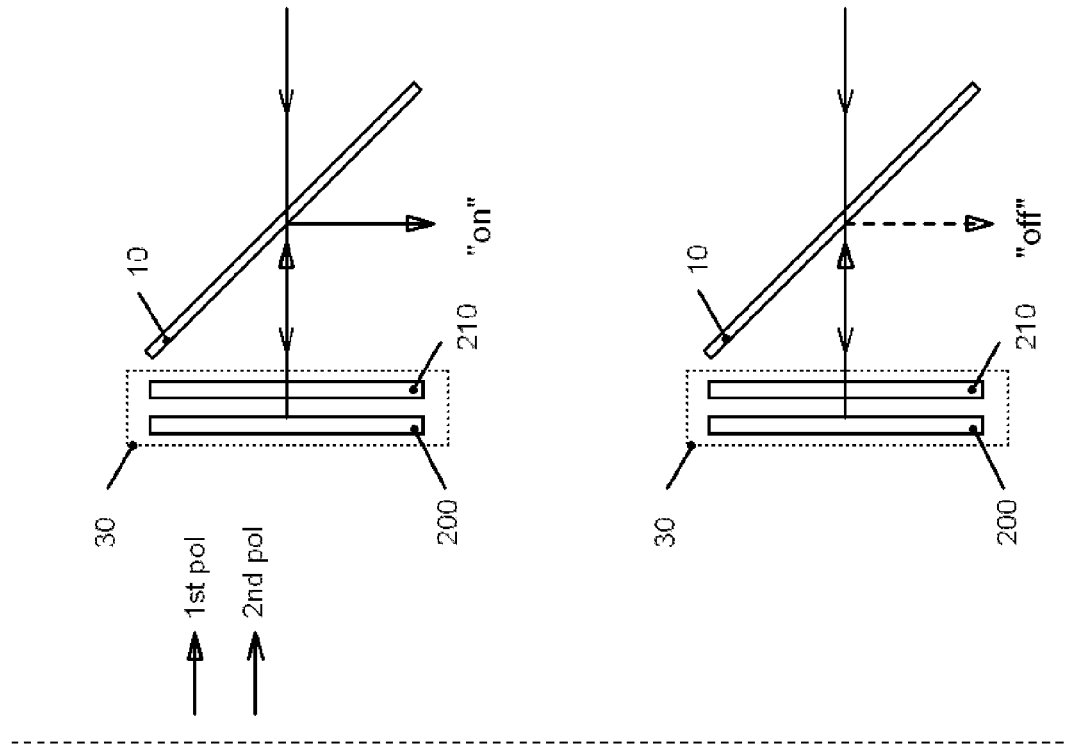
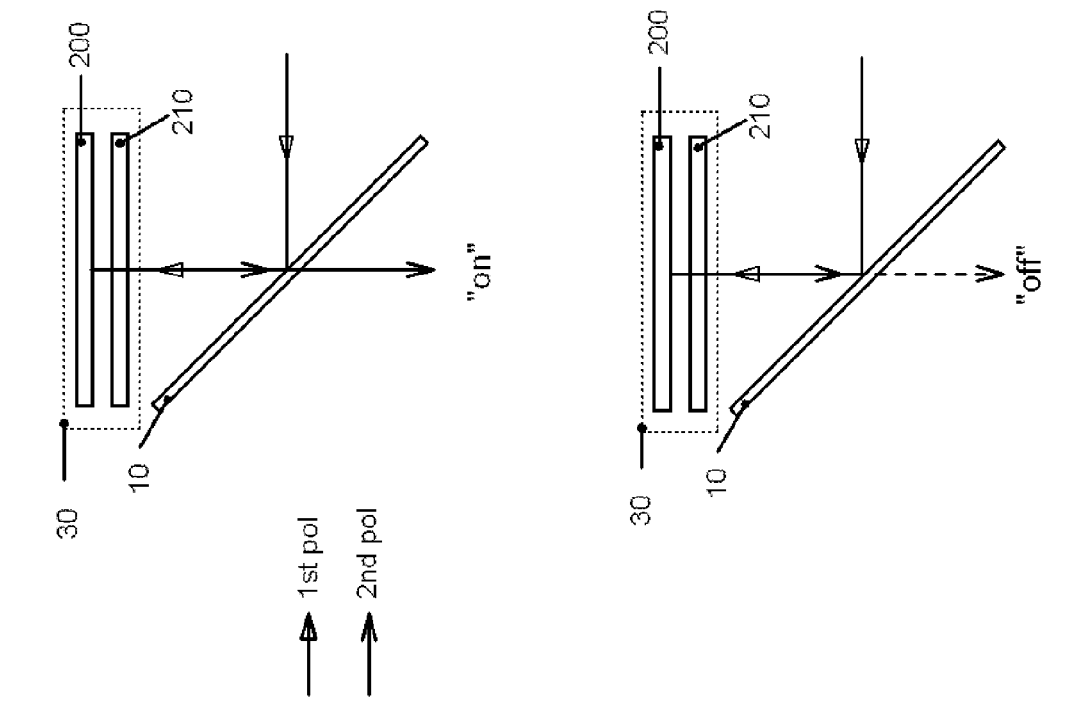

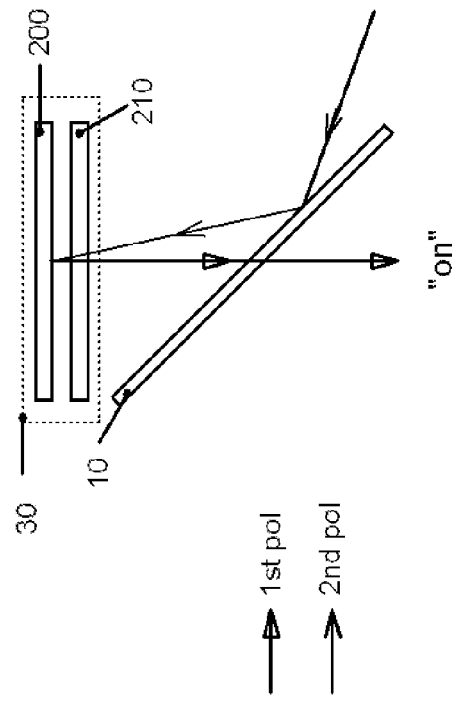
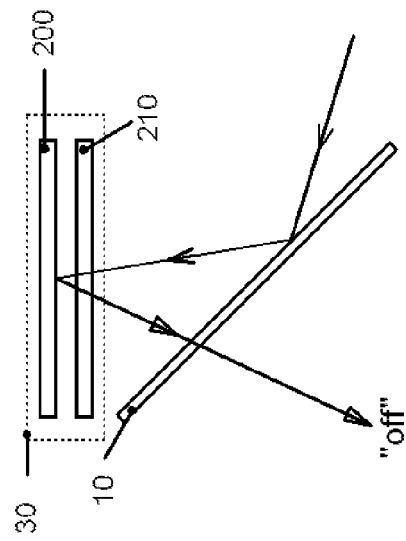
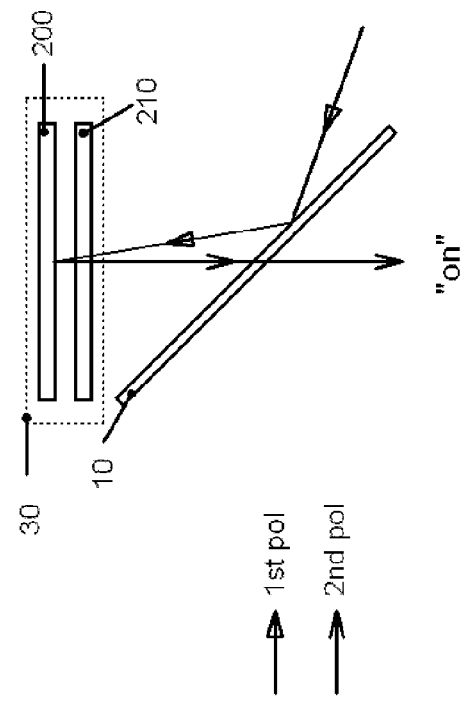
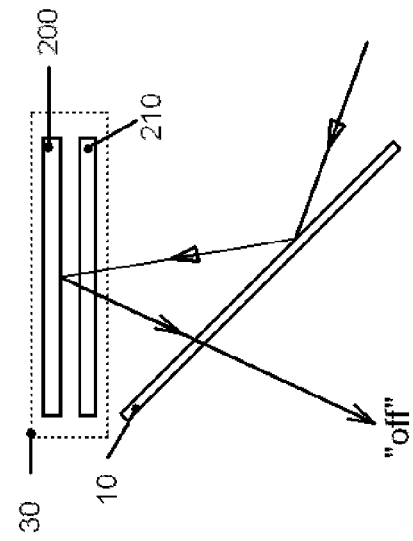
FIG. 5H
FIG. 5I

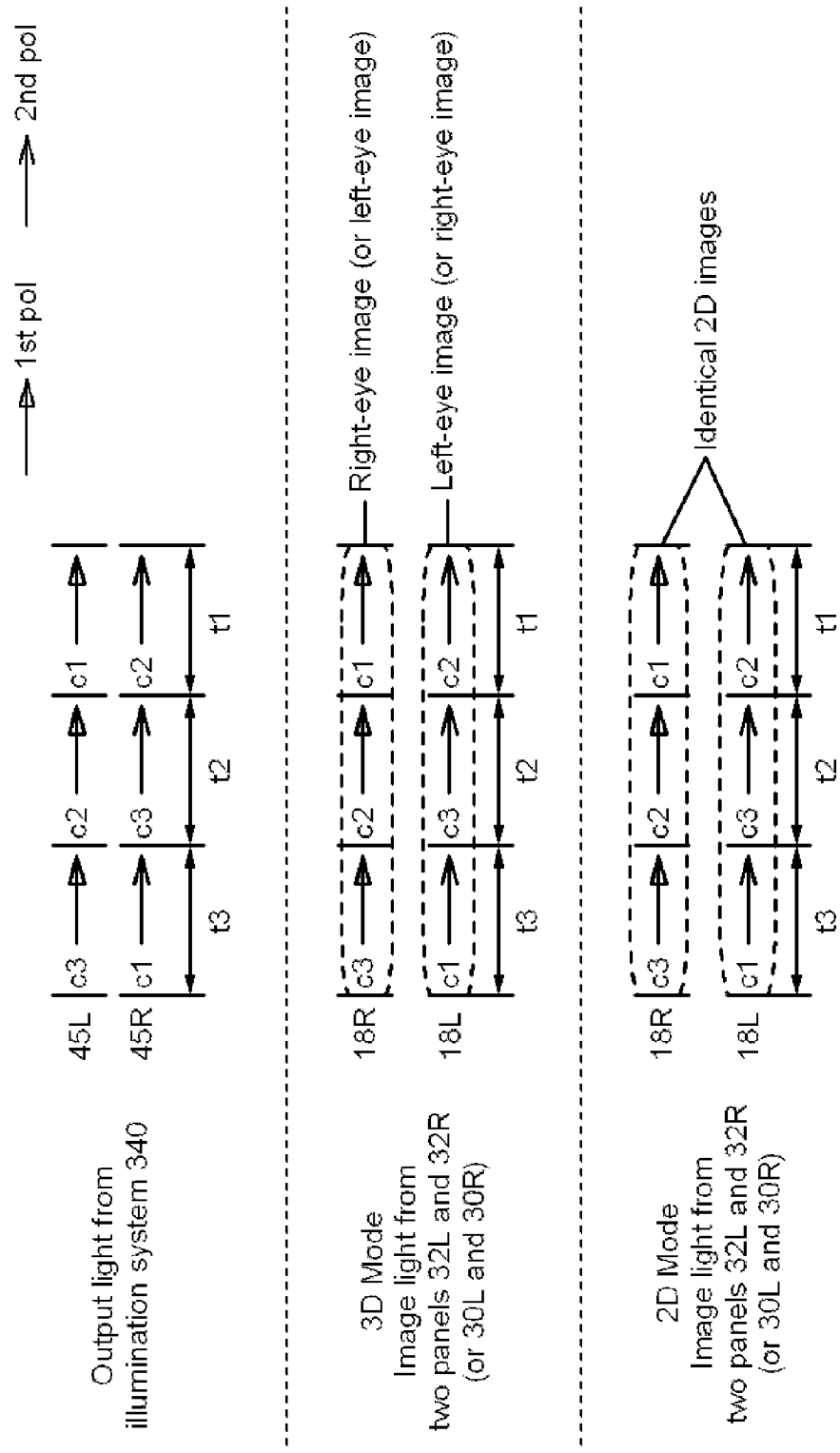

DUAL-MODE THREE-DIMENSIONAL PROJECTION DISPLAY

CROSS REFERENCE TO RELATED APPLICATION

This application claims the benefit under 35 USC 119(e) of U.S. provisional application No. 60/820,107, filed Jul. 22, 2006, the contents of which are herein incorporated by reference.

FIELD OF THE INVENTION

This invention relates to stereoscopic three-dimensional (3D) projection displays; in particular, to dual-mode 3D projection displays that can operate in an active mode with the use of active liquid crystal shutter glasses or in a passive mode with passive polarizing 3D glasses or 3D color filter glasses.

BACKGROUND OF THE INVENTION

Stereoscopic 3D projection displays, also called 3D projection displays in this specification, need to display 2D images that represent both the left- and right-eye perspective views for viewers. This can be achieved, for example, by displaying a left-eye 2D image in one polarized light and a corresponding right-eye 2D image in orthogonally polarized light so that a viewer wearing polarizing glasses receives the correct 2D images in each eye and thus perceives a 3D image. This type of 3D display is known as a passive 3D display using polarization because the viewer can use simple polarizing glasses as opposed to active shutter glasses that open and close in synchronization with the appearance of the left and right eye images. One way to achieve passive 3D viewing by polarization is to use the so-called Z-screen™ with a single projector that uses un-polarized light, such as the projectors based on Texas Instruments DLP™ panels. In this case the left and right eye images are displayed sequentially and the Z-screen encodes them in orthogonally polarized light. In a 3D projection display with Z-screen, the light efficiency for 3D images is only about 12% compared to 100% for 2D images if no Z-screen is used in the same projector. In addition, 3D projectors with Z-screen can only be based on expensive 3-chip DLP projectors. Another approach to projecting 3D images is to use two projectors that simultaneously display the left- and right-eye images in orthogonally polarized light through two external polarizers. In dual projector stereoscopic 3D displays the light efficiency for 3D images is also low, about 19% compared to 100% for 2D images if both projectors were used for projecting 2D images without the external polarizers. Dual 3D projectors are very difficult to align and to operate. They can not be aligned well enough to show identical 2D images simultaneously, thus they are dedicated to display 3D images only. Another approach to projecting 3D images is to use two projectors that simultaneously display the left- and right-eye images in different color sets known as the Infitec™ approach and as disclosed in U.S. Pat. No. 6,867,775B2. The viewer wears passive color filter glasses that transmit a left-eye image in a first color set and a right-eye image in a second color set. Each color set consists of red, green and blue light and the two color sets do not overlap spectrally. The dual projector Infitec™ approach also has low light efficiency for 3D images, about 14% compared to 100% for 2D images if both projectors were used without the required left- and right-eye filter sets. Spectral misalignment between the left-eye and right-images reduces the color gamut for this approach, although a polarization preserving screen is not required.

In another type of stereoscopic 3D projection display, known as active 3D, a single projector can alternatively display right- and left-eye 2D images time sequentially. A viewer, wearing active liquid crystal (LC) shutter glasses that are synchronized with the projector, will be able to see 3D images because the left- and right-eye LC shutters open only when the correct eye image is displayed. The LC shutters typically transmit only about 35% of the incident light. In addition, because the left- and right-eye images are each displayed at most half of the time, this arrangement is very light inefficient for displaying 3D images, with a light efficiency of 16% compared to 100% for displaying 2D images without using the LC shutter glasses. The 3D images appear very dim in comparison to the same projector displaying a single 2D image. Furthermore, LC shutter glasses need electrical power to operate, making them bulky and inconvenient to wear and are more expensive than simple polarizing glasses. But an advantage of active 3D is that ordinary screens or curved screens can be used which are desirable in some applications.

Stereoscopic 3D projection systems using two reflective liquid crystal micro-display panels (also called liquid crystal on silicon LCOS) with high performance polarizing beamsplitters were disclosed in U.S. Pat. No. 5,982,541. In the disclosure, passive 3D mode with polarizing 3D glasses is realized by projecting left- and right-eye images having orthogonal polarizations from the two panels respectively. Full color displays are achieved by using color sequential schemes: one color at a time. At any given time, the two panels share the same colors, thus the stereoscopic projectors are not as efficient as more expensive six panels stereoscopic displays, also disclosed in the same patent.

Projection displays for displaying 2D images with two panel micro-display panels were disclosed in several prior art U.S. Pat. Nos. 6,995,738 B2, 6,650,377 B2, and 5,921,650, to enhance the brightness of 2D projectors. In some approaches in the prior art, one panel is used for one dedicated color in one polarization, such as red, the other panel is used for two other colors time sequentially in the orthogonal polarization, such as blue and green. This approach is to compensate for the red color deficiency in most of arc lamps used in projection displays. In those approaches, each panel alone is not capable to display full color images, but two panels in combination can form full color images. Furthermore, additional polarization rotation filters and clean-up polarizers are used in the output image beam. Thus, these approaches are not capable of displaying full color left- or right-eye images with orthogonal polarizations that are essentially required in stereoscopic 3D images by polarization.

In another approach disclosed in U.S. Pat. No. 6,995,738 B2 as shown in FIG. 1 (also disclosed in U.S. Pat. No. 6,650,377 B2), a projector with two LCOS panels for 2D displays and two color switches as the ones available from the company ColorLink, and an analyzer were disclosed in which at any given time two colors with different polarizations are incident onto the two panels respectively. Thus, it is in principal twice as efficient as a single panel display. However, in practice, the gain in efficiency is diminished because of several factors: the required use of polarized light, un-polarized light can not be converted to polarized light with 100% efficiency, the conversion efficiency is usually less than 80%; the absorption and spectral band reduction occurring in color switches which may consist of multiple birefringent layers or filters with active control through multiple transparent electrodes, a single color switch usually has a maximum transmittance of about 70%, two color switches in series have a transmittance about 49%. In addition, because these approaches must use a second color switch and an analyzer in the output image beam to absorb light in one undesirable color, they are not capable of displaying right-eye and left-eye images with orthogonal polarizations because the image light from both panels are in the same polarization.

SUMMARY OF THE INVENTION

According to a first aspect of the invention there is provided dual mode projection display apparatus, comprising an illumination system producing first and second sub-beams with respective first and second polarizations, said first and second polarizations being orthogonal to each other, said first sub-beam comprising a first sequence of colors $c_1^1 \ldots c_i^1 \ldots c_n^1$, said second sub-beam comprising a second sequence of colors $c_1^2 \ldots c_i^2 \ldots c_n^2$, said colors $c_i^1$ and $c_i^2$, being present in respective corresponding time intervals $t_i^1$, $t_i^2$, said corresponding time intervals $t_i^1$, $t_i^2$, for each sub-beam being synchronized, and said first and second color sequences being different, so that in at least one common time interval $t_i^{1,2}$, said first and second sub-beams have different colors; first and second light modulators encoding first and second respective color image components $I_1^1 \ldots I_i^1 \ldots I_n^1$ and $I_1^2 \ldots I_i^2 \ldots I_n^2$ onto said first and second sub-beams during said common time intervals $t_i^{1,2}$ and forming respective first and second output image sub-beams having orthogonal polarizations; said first and second color image components each making-up respective first and second images; a polarizing beam splitter combining said first and second output image sub-beams into an output beam; and a projection lens for projecting the output beam onto a display screen.

Embodiments of the invention can provide highly light efficient dual-mode 3D projection displays that can operate either in a passive mode with polarizing glasses and polarization preserving screens, or color filter glasses and ordinary screens, or in an active mode with active LC shutter glasses and ordinary screens to accommodate the requirements of different applications.

Embodiments of the invention can provide dual-mode 3D projection displays that are based on single projection lens architectures and are easy to operate and maintain.

Embodiments of the invention can also provide dual-mode 3D projection displays that can display both high quality 2D and 3D images and that the 2D and 3D operation modes can be switched instantly electronically.

In another aspect the invention provides a method of displaying images on a display screen, comprising producing first and second sub-beams with respective first and second polarizations, said first and second polarizations being orthogonal to each other, said first sub-beam comprising a first sequence of colors $c_1^1 \ldots c_i^1 \ldots c_n^1$, said second sub-beam comprising a second sequence of colors $c_1^2 \ldots c_i^2 \ldots c_n^2$, said colors $c_i^1$ and $c_i^2$, being present in respective corresponding time intervals $t_i^1$, $t_i^2$, said corresponding time intervals $t_i^1$, $t_i^2$, for each sub-beam being synchronized, and said first and second color sequences being different, so that in at least one common time interval $t_i^{1,2}$, said first and second sub-beams have different colors; encoding first and second respective color image components $I_1^1 \ldots I_i^1 \ldots I_n^1$ and $I_1^2 \ldots I_i^2 \ldots I_n^2$ onto said first and second sub-beams during said common time intervals $t_i^{1,2}$ and forming respective first and second output image sub-beams having orthogonal polarizations; said first and second color image components each making-up respective first and second images; combining said first and second output image sub-beams into an output beam; and projecting the output beam onto the display screen.

BRIEF DESCRIPTION OF THE DRAWINGS

The present invention and exemplary embodiments of the invention will be described in accordance to the following drawings in which:

FIG. 3A is a schematic view showing a typical transmissive LCD micro-display panel used in the present invention;

FIG. 3B is a schematic view showing another typical transmissive LCD micro-display panel used in the present invention;

FIG. 4A is a schematic view showing a typical reflective LCOS micro-display panel used in the present invention;

FIG. 4B is a schematic view showing another typical reflective LCOS micro-display panel used in the present invention;

FIG. 5F is a schematic view showing a first typical reflective MEM micro-display panel used in the present invention (the incident light on, and reflected light from, the panel 30 are in the same plane, but they do not follow a co-linear path);

FIG. 5G is a schematic view showing a second typical reflective MEM micro-display panel used in the present invention (the incident light on, and reflected light from, the panel 30 are in the same plane, but they do not follow a co-linear path);

FIG. 5H is a schematic view showing a third typical reflective MEM micro-display panel used in the present invention;

FIG. 5I is a schematic view showing a fourth typical reflective MEM micro-display panel used in the present invention;

FIG. 10A shows the color and polarization sequences of the output light from the illumination system 340 and the image light from the two micro-display panels 32L and 32R (or 30L and 30R) for displaying 2D and 3D images in the passive operation mode with polarizing glasses;

DETAILED DESCRIPTION OF THE INVENTION

PBS Device Types

In accordance with the present invention of dual-mode 3D projection displays, polarizing beam-splitter (PBS) devices are used in some embodiments to separate un-polarized and/or to combine polarized light. A PBS device reflects a first polarization and transmits a second polarization. The first polarization and the second polarization are orthogonal to each other. Different types of PBS devices can be used in the present invention. By way of examples, several PBS device types are incorporated in the present invention and are described in the text below.

Figure 2A:
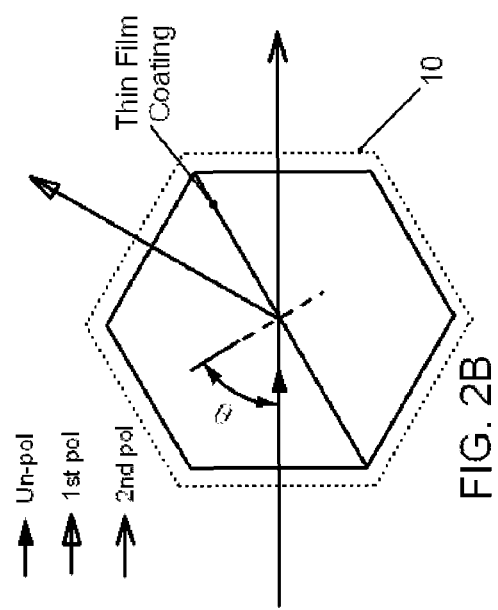
FIG. 2A is a schematic view of a Type A thin film polarizing beam-splitter device which reflects s-polarized light and transmits p-polarized light.
Figure 2B:
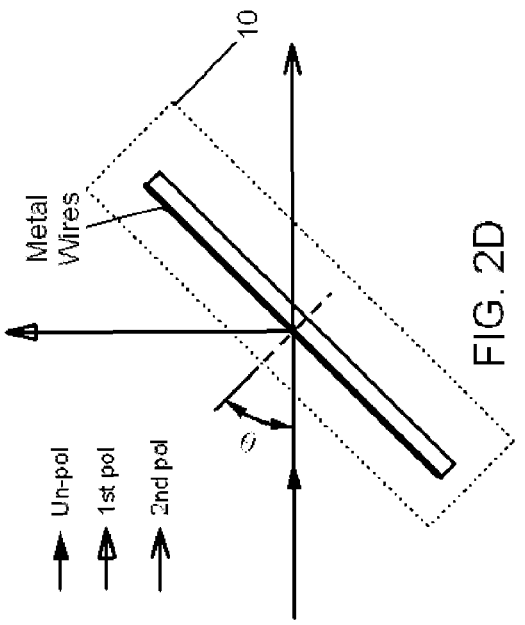
FIG. 2B is a schematic view of a Type B thin film polarizing beam-splitter device with frustrated total internal reflection that reflects p-polarized light and transmits s-polarized light.
Figure 2C:
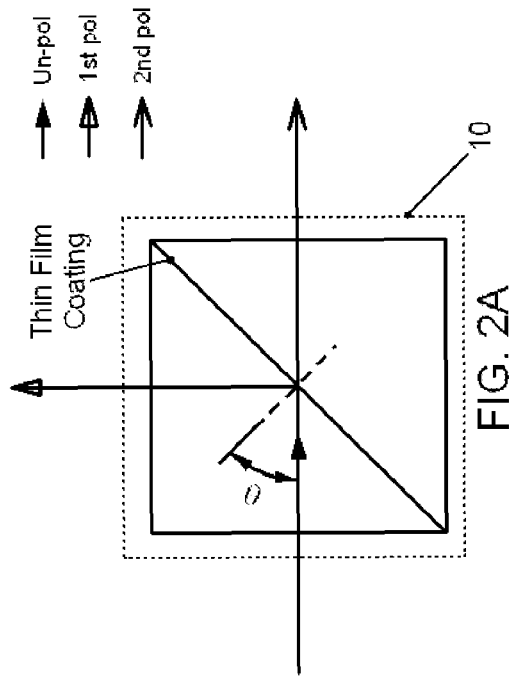
FIG. 2C is a schematic view of a Type C birefringent multilayer film polarizing beam-splitter device that reflects s-polarized light and transmits p-polarized light or vise versa.
Figure 2D:
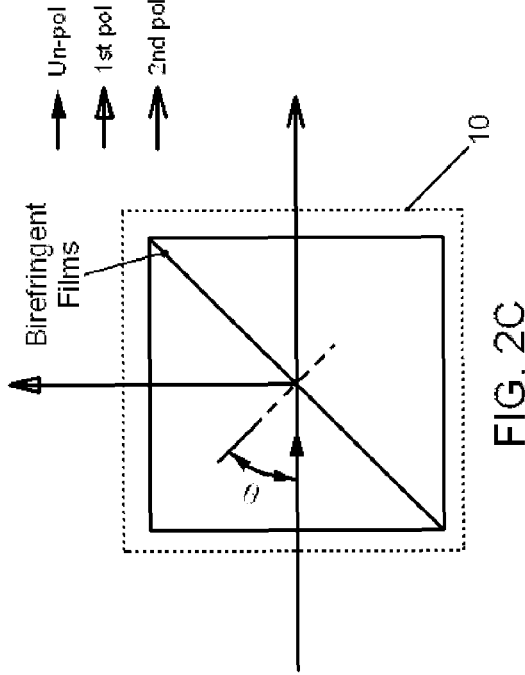
FIG. 2D is a schematic view of a Type D metal-wire grid polarizing beam-splitter device that reflects s-polarized light and transmits p-polarized light or vise versa.

Type A PBS device, shown in FIG. 2A, is based on thin film interference coatings where the thin film beam-splitting (BS) coating is between two transparent prisms. Type A PBS device reflects s-polarized light and transmits p-polarized light and usually operates at a central angle of incidence θ equal to 45°. Type B PBS device, shown in FIG. 2B, is based on thin film interference as well as frustrated total internal reflection in thin film coatings, the thin film beam-splitting coating is also between two transparent prisms. Unlike Type A PBS device, Type B PBS device reflects p-polarized light and transmits s-polarized light, as disclosed in U.S. Pat. No. 5,912,762. Type C PBS device, shown in FIG. 2C, is based on birefringent multilayer thin plastic films, and the beam-splitting films are usually between two transparent prisms, such as the one disclosed in U.S. Pat. No. 6,690,795. Depending on the alignment of the birefringent films, Type C PBS device can reflect s-polarized light and transmit p-polarized light, or vise versa. Type D PBS device, shown in FIG. 2D, is based on metal-wire grids on a transparent plate, such as the one disclosed in U.S. Pat. No. 6,122,103, the beam-splitting metal-wire grids are on one side of the plate. Based on the alignment of the metal wires, Type D PBS device can reflect s-polarized light and transmit p-polarized light, or vise versa. Type E PBS also reflects s-polarized light and transmits p-polarized light and operates at a central angle of incidence θ greater than 45° as described in the paper by Li Li and Dobrowolski, Applied Optics, Vol. 39, Issue 16, pp. 2754-2771. Type E is similar to type A that reflects s-polarized light and transmits p-polarized light except that the central angle of incidence θ is greater than 45°. Type E is also based on thin film interference coatings.

Without departing from the spirit of the invention, other beam-splitting angles rather than the ones shown in FIGS. 2A-2D and other types of PBS devices can be used in the present invention as well.

Micro-Display Devices

In the present invention of dual-mode 3D projection displays, several different micro-display panels can be used. Typical sizes of micro-display panels are from 0.55" to 2.0" in diagonal. The first type of micro-displays is based on transmissive liquid crystal displays (LCDs) that can form images by controlling the polarization states of each individual pixel. These liquid crystal displays are sometimes also called high-temperature poly-silicon (HTP) displays. FIG. 3A shows a typical LCD panel 32 used in accordance with the present invention. The LCD panel 32 consists of a pixelated active liquid crystal structure 130 with addressing matrices and two polarizers 110 and 120. The polarizer 110 transmits light in a first polarization and blocks light in a second polarization, while the polarizer 120 transmits the second polarization and blocks the first polarization. The first and second polarizations are orthogonal to each other. For "on" pixels, the liquid crystal layer 130 rotates the polarization state of the incident light from the first polarization to the second polarization thus the light transmits through the panel. For "off" pixels, the liquid crystal structure does not rotate the polarization state of the incident light, thus the light is blocked by the second polarizer 120. FIG. 3B shows another typical LCD panel 32 used in accordance with the present invention. In this case, the polarizer 110 blocks light in the first polarization and transmits light in the second polarization, while the polarizer 120 blocks the second polarization and transmits the first polarization. For "on" pixels, the liquid crystal structure rotates the polarization state of the incident light from the second polarization to the first polarization thus the light transmits through the panel. For "off" pixels, the liquid crystal structure does not rotate the polarization state of the incident light, thus the light is blocked by the second polarizer 120. The micro-display 32 can be optimized to operate for a broadband of wavelengths such as from 400-700 nm in the visible, or it can be optimized to operate for a narrowband of wavelengths such as for red, blue, or green colors only.

The second type of micro-displays is based on reflective liquid crystal displays that also can form images by controlling the polarization states of each individual pixel. These liquid crystal displays are also called liquid crystal on silicon (LCOS), or direct-drive image light amplifier (DILA). FIG. 4A shows a typical LCOS 30 panel used in accordance with the present invention with a polarizing beam-splitter 10 (although any type of PBS described above can be used; only a plate PBS is shown here for illustration purpose). The LCOS panel 30 consists of a pixelated reflective liquid crystal structure 300 and an optional waveplate 310. The PBS 10 reflects light in a first polarization and transmits light in a second polarization. The first and second polarizations are orthogonal to each other. The optional waveplate 310 is usually a quarter-wave plate or combinations of waveplates that can compensate for geometrical depolarization of the incident polarized light (resulting from reflection and transmission of skew rays at optical interfaces) and thus improve display contrast. In FIG. 4A, the incident light is polarized in the first polarization state and thus is reflected by the polarizing beam-splitter 10 towards the panel 30. For "on" pixels, the liquid crystal structure rotates the polarization state of the incident light from the first polarization to the second polarization thus the light transmits through the PBS 10 towards a projection lens which is not shown here. For "off" pixels, the liquid crystal structure does not rotate the polarization state of the incident light, thus the light is reflected back by the PBS 10. FIG. 4B shows another typical LCOS panel 30 used in accordance with the present invention with a polarizing beam-splitter 10. The LCOS panel 30 consists of a pixelated reflective liquid crystal structure 300 and an optional waveplate 310. The PBS 10 reflects the first polarization and transmits the second polarization. The optional waveplate 310 is usually a quarter-wave plate or combinations of waveplates that can compensate the geometrical depolarization of the incident polarized light and thus improve display contrast. The incident light is polarized in the second polarization state, thus it is transmitted through the polarizing beam-splitter 10. For "on" pixels, the liquid crystal structure rotates the polarization state of the incident light from the second polarization to the first polarization thus the light is reflected by the PBS 10 towards a projection lens which is not shown here. For "off" pixels, the liquid crystal structure does not rotate the polarization state of the incident light, thus the light transmits through the PBS 10 back to the direction of the incident light. The micro-display 30 can be optimized to operate for a broadband of wavelengths such as from 400-700 nm in the visible, or it can be optimized to operate for a narrowband of wavelengths such as for red, blue, or green colors only.

Figure 1:
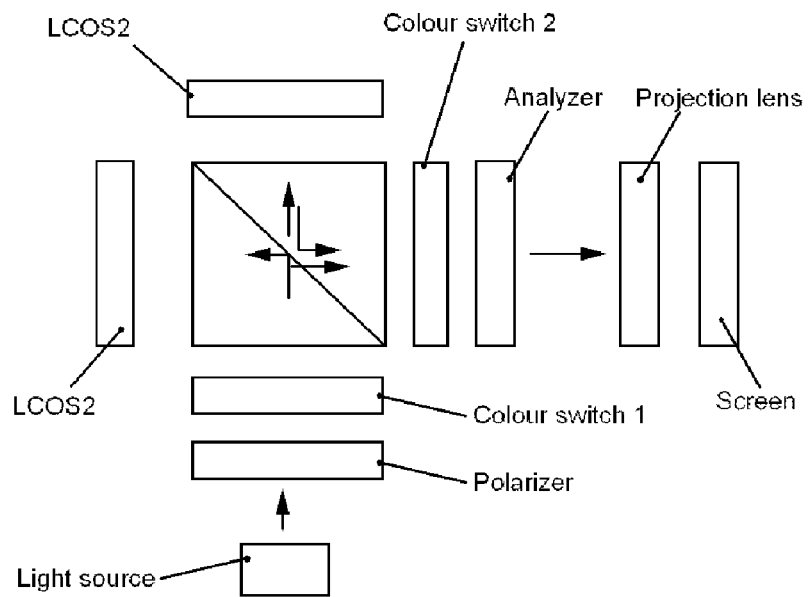
FIG. 1 shows a projector in prior art with two LCOS panels and two color switches.
Figure 5A:
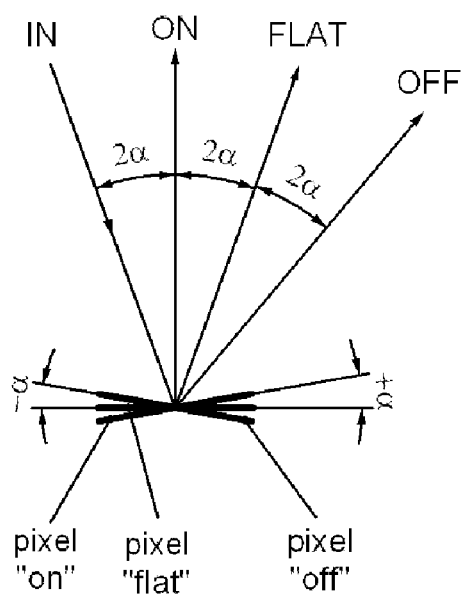
FIG. 5A is a schematic view of the working principle of micro-mirrors in a MEM device.

The third type of micro-displays is based on micro-electrical-mechanical (MEM) devices with plural digital micromirrors (DMD) or pixels arranged in rows and columns used to form images. A typical MEM device for display applications is Texas Instruments' DLP™ panels. Each individual micro-mirror or pixel in a MEM device can be titled either +α angle or −α angle as shown in FIG. 5A. An incident beam comes usually from an angle of 2α to the normal. When the pixel is "on", it rotates an angle +α towards the incident light thus the light is reflected normal to the surface of the device panel, and it is then projected onto a screen with a projection lens. When the pixel is "off", it rotates an angle −α away from the incident light thus the light is reflected 4α away from the "on" beam. The "off" pixel light is outside of the projection lens and is then absorbed by light absorbers. If the pixel is in the "flat" state or for any specular surface on the MEM device, the light is reflected 2α away from the "on" pixel light. The "flat" pixel light is also outside of the projection lens and is also absorbed by a light absorber. The incident beam, the "on" pixel beam, the "flat" pixel beam and the "off" pixel beam are all in one plane, this plane is defined as the incident plane of each individual micro-mirror or pixel. The tilting angle α of the micro-mirror or pixel is normally between 10°-12° which usually determines the apertures of the illumination system and the projection system in a MEM projection apparatus.

Figure 5B:
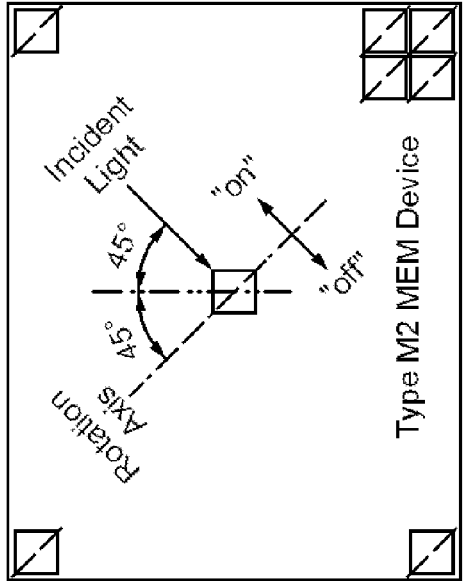
FIG. 5B is a top view of a MEM device, designated Type M1 in accordance with the present invention, showing the rotation axis of each individual micro-mirror or pixel and the direction of the incident plane of the incident beam.
Figure 5C:
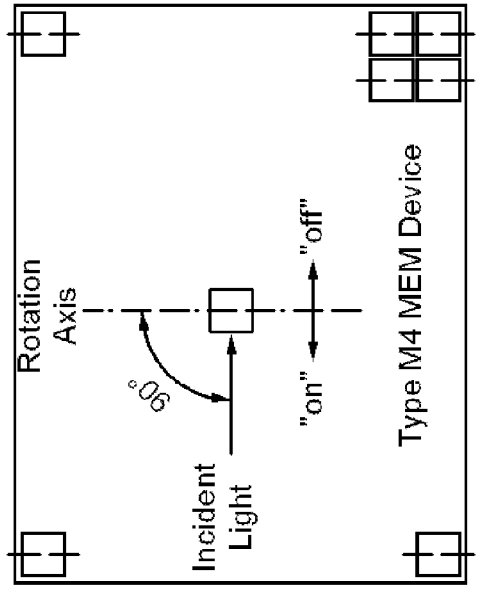
FIG. 5C is a top view of a MEM device, designated Type M2 in accordance with the present invention, showing the rotation axis of each individual micro-mirror or pixel and the direction of the incident plane of the incident beam.

The most commonly used MEM device, such as Texas Instruments DLPs, is shown in FIG. 5B, and is designated here as a Type M1 MEM device. Each micro-mirror or pixel is a square shape as shown in FIG. 5B. The rotation axis of each individual micro-mirror or pixel is along its diagonal and is aligned 45° with regard to the panel and is towards the top-right side of the panel. The incident beam is from the direction of top-left and the incident plane is perpendicular to the rotation axis and the surface of the device. A Type M2 MEM device, as shown in FIG. 5C, is similar to the Type M1 MEM device and they are mirror image of each other. The rotation axis of each individual micro-mirror or pixel is also along its diagonal but is aligned 45° with regard to the panel but towards the top-left side of the device. The incident beam is from the direction of top-right and the incident plane is perpendicular to the rotation axis and the surface of the device. Type M1 and M2 MEM devices are sometimes used in pairs in the present invention when two mirror-image MEM devices are needed to form combined images.

Figure 5D:
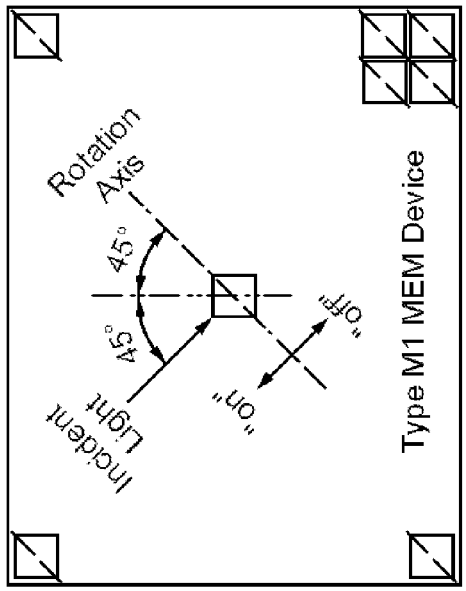
FIG. 5D is a top view of a MEM device, designated Type M3 in accordance with the present invention, showing the rotation axis of each individual micro-mirror or pixel and the direction of the incident plane of the incident beam.

A Type M3 MEM device has diamond-shape micro-mirrors as shown in FIG. 5D. The rotation axis of each pixel is also along its diagonal but is parallel to the centre vertical line of the device surface. Because of the diamond-shape pixels, the row and column definitions for Type M3 MEM devices are different from those of conventional MEM devices, M1 and M2. Thus, any row and column signal inputs need to be mapped to the present device. The incident beam is from the horizontal direction and the incident plane is perpendicular to the rotation axis and the surface of the device. Type M3 MEM device are sometimes preferred in the present invention when two MEM devices are needed to form combined images. Two identical Type M3 MEM devices can be used.

Figure 5E:
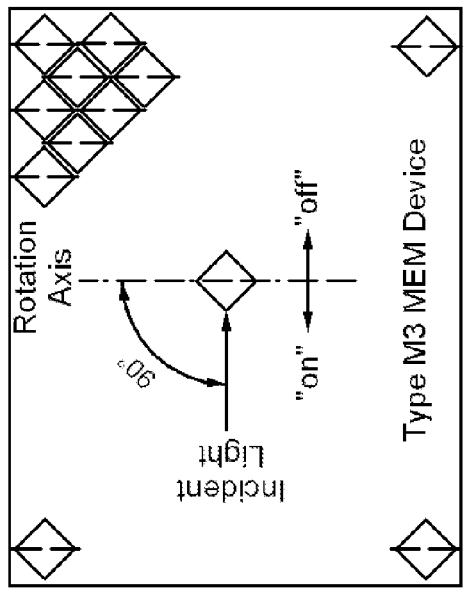
FIG. 5E is a top view of a MEM device, designated Type M4 in accordance with the present invention, showing the rotation axis of each individual micro-mirror or pixel and the direction of the incident plane of the incident beam.

A Type M4 MEM device, as shown in FIG. 5E, is similar to the Type M3 MEM device except that each micro-mirror or pixel is a square instead of a diamond shape. The rotation axis is along the centre vertical line of each individual micro-mirror or pixel. The definitions of rows and columns are the same as the conventional definitions. Thus no signal mapping is required. The incident beam is also from the horizontal direction and the incident plane is perpendicular to the rotation axis and the surface of the device. Type M4 MEM devices are sometimes preferred in the present invention when two MEM devices are needed to form combined images.

Of the above types M1-M4 MEM devices, the type M1 MEM device is the only microdisplay panel commercially available today for use in projectors and Texas Instruments is the sole supplier. Although types M2-M4 are sometimes preferred in the present invention, no commercial devices are currently available.

In accordance with the present invention, MEM devices are used with associated waveplates to form MEM panels. FIGS. 5F-5I shows a MEM panel 30 with a polarizing beam-splitter 10. The MEM panel 30 consists of a pixelated reflective MEM device 200 and a waveplate 210. The PBS 10 reflects light in a first polarization and transmits light in a second polarization. The first and second polarizations are orthogonal to each other. The waveplate 210 is usually a quarter-wave plate or a combination of waveplates that rotate the polarization state of the incident light from the first polarization to the second polarization or vise versa on a double pass through the waveplates. Preferably, it can also compensate the geometrical depolarization of the incident polarized light and thus improve display contrast or cross-talk. FIG. 5F shows a first typical MEM panel 30 used in accordance with the present invention. The incident light is polarized in the first polarization state. For "on" pixels, the light is reflected by the MEM device at a predefined angle and the polarization state of the incident light is rotated by the waveplate 210 from the first polarization to the second polarization, thus the light transmits through the PBS 10 towards a projection lens which is not shown here. For "off" pixels, the light is reflected by the MEM device at a predefined angle, but different than the angle of "on" pixels. Depending on the properties of the waveplate 210 and the PBS 10, the reflected "off" pixel light may be partially converted to the second polarization, and thus some of the light is reflected and some of the light is transmitted by the PBS 10. For the "off" pixel light transmitted by the PBS 10, it travels in a different direction than the "on" pixel light and thus does not reach the projection lens (not showing here) and is absorbed by a light absorber. For the "off" light reflected by the PBS 10, the light travels in different direction than the incident light and is absorbed by a light absorber not shown here. FIG. 5G shows a second typical MEM panel 30 used in accordance with the present invention with a polarizing beam-splitter 10. The incident light is polarized in the second polarization state. For "on" pixels, the light is reflected by the MEM device at a predefined angle and the polarization state of the incident light is rotated by the waveplate 210 from the second polarization to the first polarization, thus the light is reflected by the PBS 10 towards a projection lens which is not shown here. For "off" pixels, the light is reflected by the MEM device at a predefined angle, but different than the angle of "on" pixels. Depending on the properties of the waveplate 210 and the PBS 10, the reflected "off" pixel light may be partially converted to the first polarization, and thus some of the light is reflected and some of the light is transmitted by the PBS 10. For the "off" pixel light reflected by the PBS 10, it travels in a different direction than the "on" pixel light and thus does not reach the projection lens (not shown here) and is absorbed by a light absorber. For the "off" light transmitted by the PBS 10, the light travels in different direction than the incident light and is absorbed by a light absorber not shown here. Depending on the layout of the MEM device, different orientation of the MEM device surface with regard to the PBS surface can be used. The microdisplay 30 can be optimized to operate for a broadband of wavelengths such as from 400-700 nm in the visible, or it can be optimized to operate for a narrowband of wavelengths such as for red, blue, or green colors only.

FIGS. 5H-5I show a third and fourth typical MEM devices used in the present invention having different alignments between the polarizing beam-splitter and the MEM device. Detailed descriptions of these alignments follow in the next section. (FIGS. 5F and 5G use Type II alignment while FIGS. 5H and 5I use Type III or IV alignment.)

Without departing from the spirit of the invention, other arrangements of pixels or types of MEM devices can also be used in the present invention.

Light Alignment Approaches

In accordance with the present invention of dual-mode projection displays having reflective MEM devices, polarizing beam-splitters and MEM devices are used together to combine separated image paths in a projection apparatus. Proper alignment of the MEM devices and PBSs are important in the present invention. The orientation of the MEM devices and the alignment of the incident light and the reflected beams with respect to the PBS and its beam-splitting surface determine the angular field over which the PBS must work. Ideally, the geometrical considerations allow the angular field at the beam-splitting surface to be minimized because it is more difficult to achieve good PBS performance over a large angular field. Furthermore, it is advantageous to minimize the size of the PBS needed to combine the image beams from two panels. By way of example, several light alignment approaches, designated here as Type I, II, III and IV, are incorporated in the present invention and are described below.

Each polarizing beam-splitter is used to combine images from a pair of first and second MEM devices. Each MEM device has an alignment direction which is parallel to the rotation axes of the micro-mirrors. The first and second MEM devices are aligned such that the projections of their alignment directions (which may be reflected by additional mirrors in some cases) form a common alignment direction after combination by the polarizing beam-splitter. For simplicity, only the first MEM device in the reflected arm is shown in the figures associated with Type I, II, III and IV alignments.

In the following descriptions, the incident plane of the micro-mirror is defined by the incident light on the micro-mirror, and the reflected light for the "on", "flat" and "off" pixels. The incident plane of the PBS is defined by the reflected "on" pixel light incident upon the beam-splitting (BS) surface, and the normal of the beam splitting surface. The incident plane of the PBS and the common alignment direction form an angle γ.

Figure 6A:
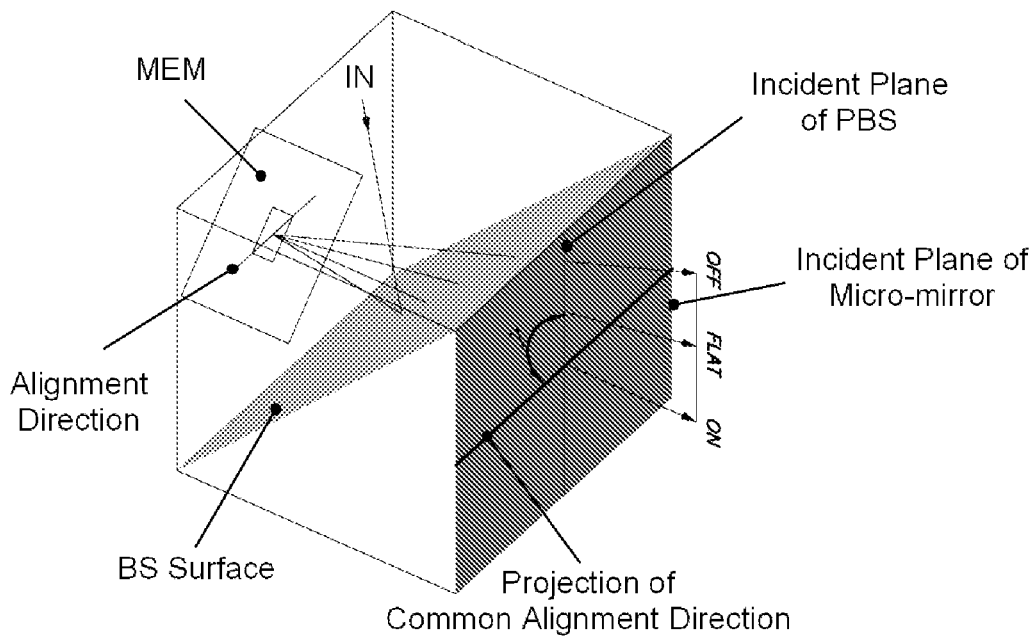
FIG. 6A is a schematic three-dimensional perspective view of a MEM device and a polarizing beam-splitter that shows the incident, "on", "flat" and "off" pixel light directions relative to the beam splitting (BS) surface and the micro-mirror array. In accordance with the present invention this arrangement is designated Type I alignment. The thin-film beam-splitting surface and beam-splitter exit face are shaded to aid visualization.

FIG. 6A shows a three-dimensional perspective view of Type I alignment, in which the alignment direction and the rotation axes of the micro-mirrors or pixels on the MEM device are arranged horizontally, as shown, and the incident plane of the PBS is vertical, thus the angle γ between the incident plane of the PBS and the common alignment direction is 90° as shown. The beam-splitting surface of the polarizing beam-splitter is perpendicular to the incident plane of the micro-mirror and intersects the incident plane as shown. In Type I alignment, the angular field including the incident and "on" pixel beams at the beam-splitter surface is maximized. In the present invention, it is least desirable to have such alignment because the PBS has to operate over a large angular field.

Figure 6B:
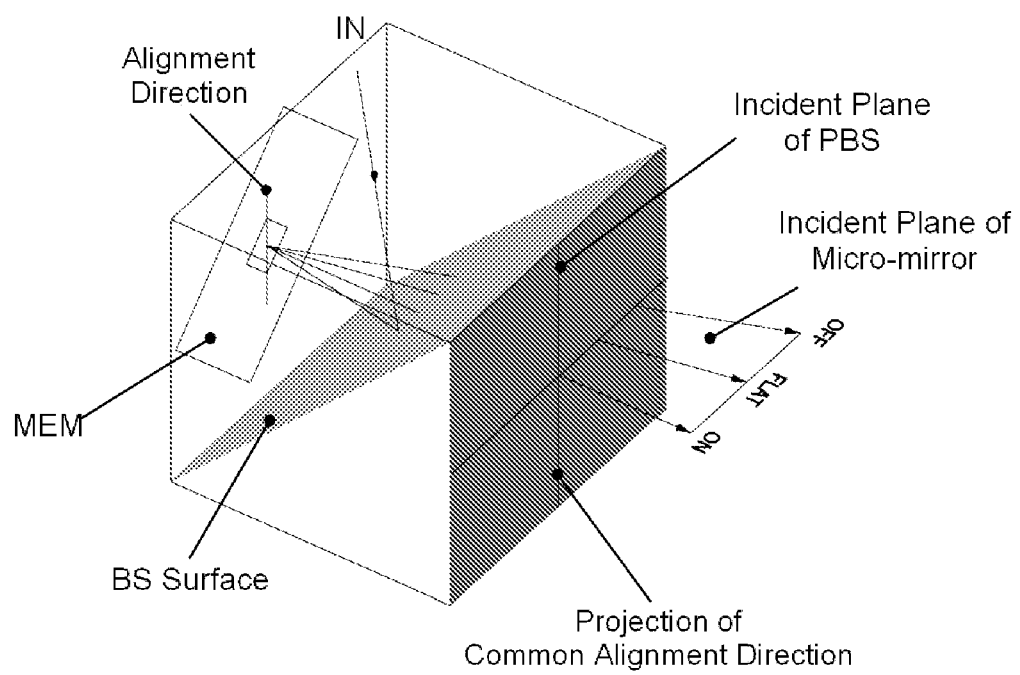
FIG. 6B is a schematic three-dimensional perspective view illustrating the light alignment between a MEM device and a polarizing beam-splitter. In accordance with the present invention, this arrangement is designated Type II alignment.

FIG. 6B shows a three-dimensional perspective view of Type II alignment, in which the alignment direction and the rotation axis of micro-mirrors or pixels on the MEM device is arranged vertically, as shown, the incident plane of the micro-mirror is horizontal and the beam-splitting surface of the polarizing beam-splitter is not perpendicular to the incident plane of the micro-mirror. The incident plane of the PBS and the common alignment direction are parallel with each other, thus the angle γ between them is 0°. In Type II alignment, the angular field including the incident beam and the "on" pixel beam at the beam-splitter surface is minimized. Type II alignment is a preferred approach in the present invention because the PBS operates over a relatively small angular field. However, the use of the available type M1 MEM device in such an alignment leads to the requirement of a large PBS size which is not desirable.

Figure 6C:
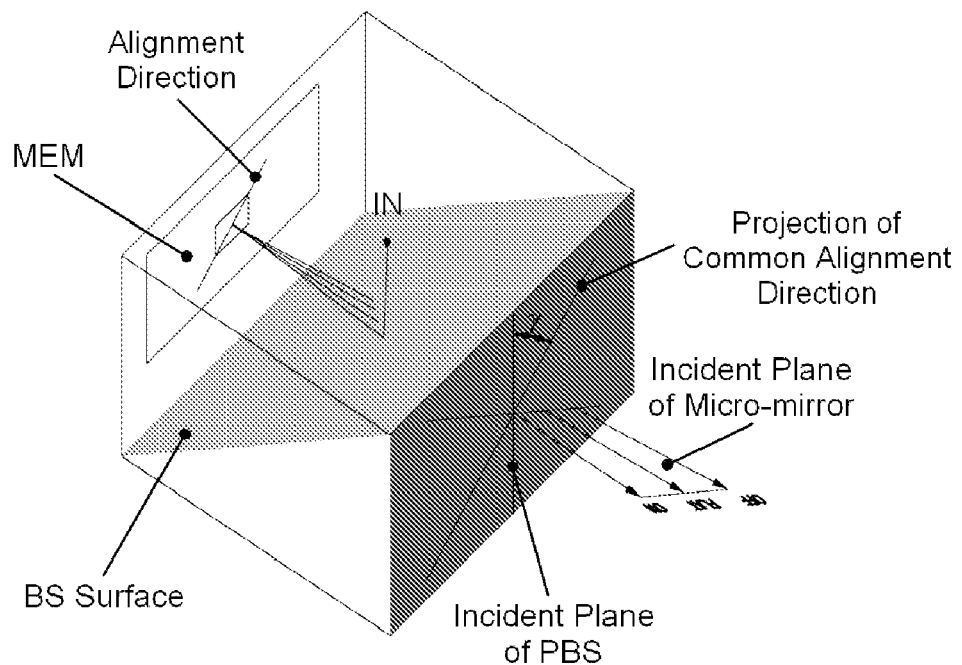
FIG. 6C is a schematic three-dimensional perspective view illustrating the light alignment between a MEM device and a polarizing beam-splitter. In accordance with the present invention, this arrangement is designated Type III alignment.

FIG. 6C shows a three-dimensional perspective view of Type III alignment, in which the incident plane of the PBS and the common alignment axis forms the angle γ. In Type III alignment, the angular field including the incident beam and the "on" pixel beam at the beam-splitter surface is determined by the angle γ. The closer γ is to 0° the smaller the angular field at the BS surface. The PBS size needed is minimized when γ=45° for types M1 and M2 MEM devices. In the present invention, it is preferred to have 0°≦γ≦45° when using Type M1 or Type M2 MEM devices. In the Type III alignment approach, the incident beam has a smaller incident angle with the BS surface than the "on" pixel beam.

Figure 6D:
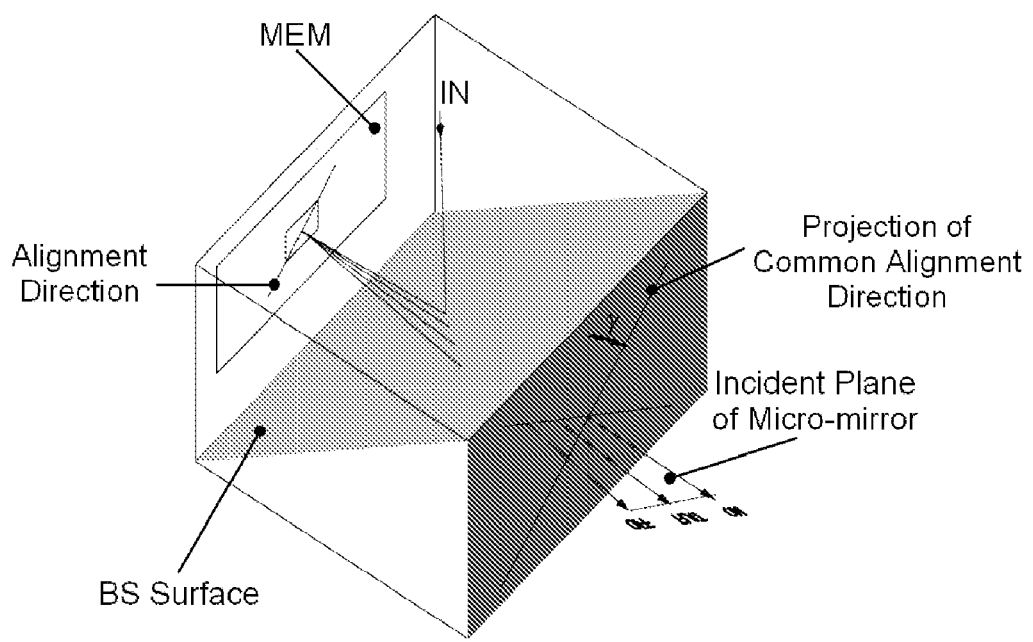
FIG. 6D is a schematic three-dimensional perspective view illustrating the light alignment between a MEM device and a polarizing beam-splitter. In accordance with the present invention, this arrangement is designated Type IV alignment.

FIG. 6D shows a three-dimensional perspective view of Type IV alignment that is similar to Type III alignment. The incident plane of the PBS and the common alignment direction form an angle γ. In Type IV alignment, the angular field including the incident beam and the "on" pixel beam at the beam-splitter surface is determined by the rotation angle γ. The closer γ is to 0°, the smaller the angular field at the BS surface. In the present invention, it is desirable to have γ=45° when using Type M1 or M2 MEM devices because in this case, the MEM devices are aligned with the edges of the polarizing beam-splitter minimizing the size of the PBS needed. In Type IV alignment, the incident beam has a larger incident angle on the BS surface than that of the "on" pixel beam.

Figure 6E:
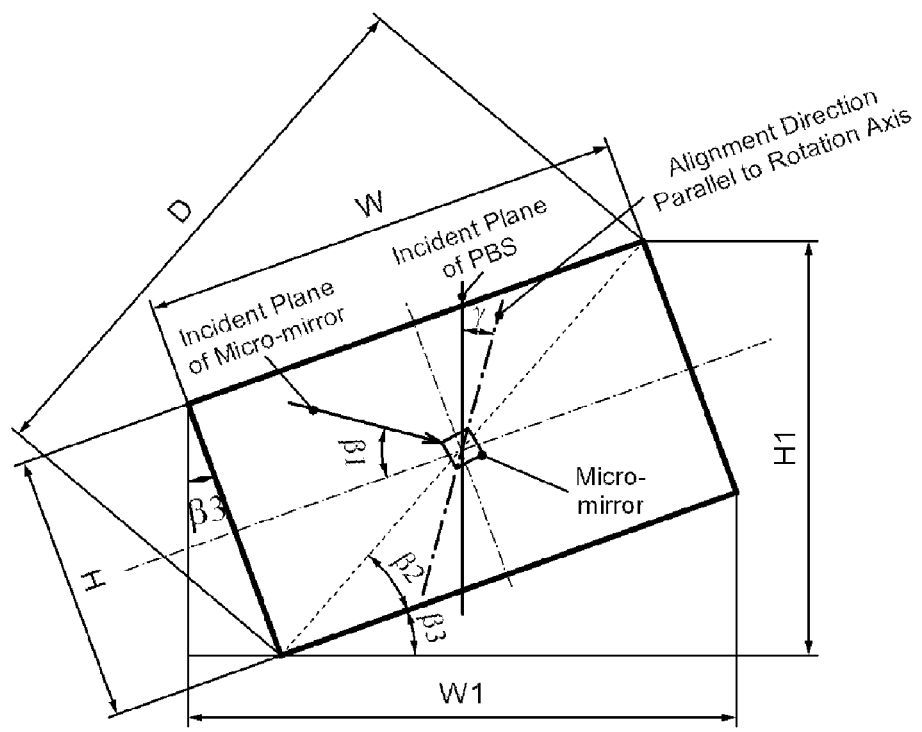
FIG. 6E shows the relationship between the effective height $H_1$ and width $W_1$ of a MEM device with respect to its actual height H and width W.

As mentioned in the previous section, the commercially available MEM devices are type M1 from Texas Instruments. As shown in FIGS. 6A-6E, the effective height of the MEM device $H_1$ determines the PBS size which in turn determines the optical path through the PBS and the required back focal length for the projection lens. Thus, it is advantageous to minimize PBS size and thus reduce the cost of the optics. FIG. 6E shows the relationship between effective height $H_1$ and width $W_1$ of the MEM device and the actual height H and width W of the MEM device with respect to the angle γ and the equations for $H_1$ and $W_1$ are as follows:

$$\begin{cases} D = \sqrt{H^2 + W^2} \\ \beta_2 = \tan^{-1}\frac{H}{W} \\ \beta_3 = \beta_1 - \gamma \\ H_1 = D\sin(\beta_2 + \beta_3) \\ W_1 = H\sin\beta_3 + W\cos\beta_3 \end{cases}$$

Figure 6F:
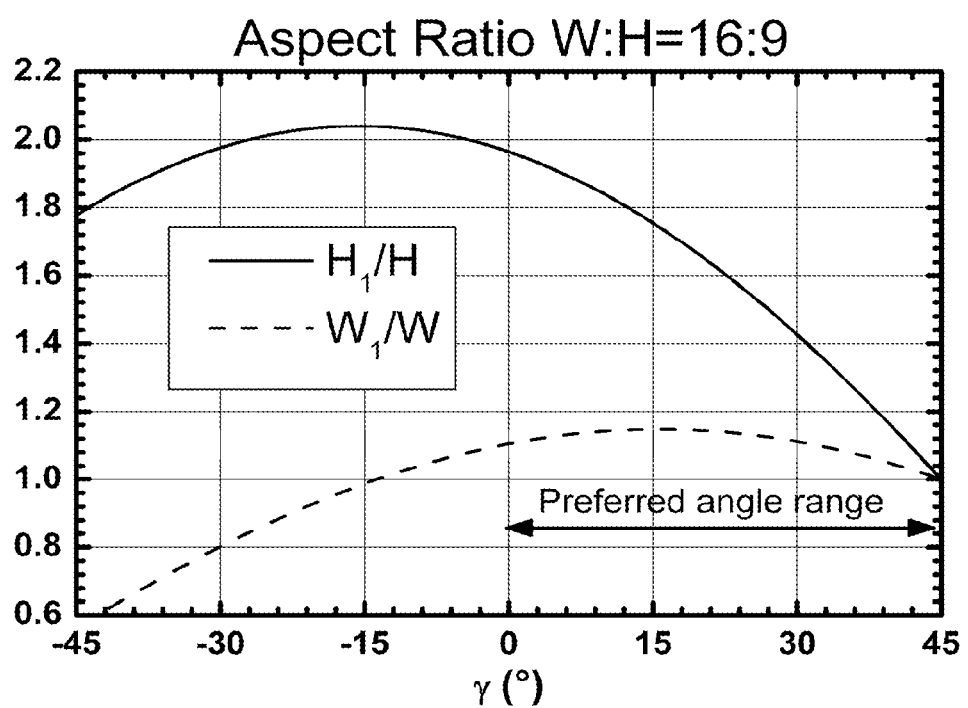
FIG. 6F shows the ratios of $H_1/H$ and $W_1/W$ for a MEM device with aspect ratio of 16:9 (W:H) with the angle γ.

FIG. 6F shows the ratios of $H_1/H$ and $W_1/W$ with respect to the angle γ for a MEM device with an aspect ratio 16:9 (W:H). Clearly, for the alignment Type II arrangement where γ=0°, the effective height is almost doubled the actual panel height. This is not a desirable situation as the PBS must be made much larger in order to illuminate the panel and collect the reflected image light through the PBS. When γ=45°, the PBS size is minimized and the MEM panel and the PBS are straight forward to align relative to each other as shown in FIGS. 6C and 6D, however the angular field requirement placed on the PBS is larger than in the γ=0° case. In order to achieve a good combination of minimizing the size of the PBS and the angular field over which the beam splitting surface of the PBS must work, it is therefore advantageous to have the angle γ between 0° and 45°.

For the purposes of illustration, in all drawings of the specification of the present invention, changes in direction of the beam paths due to light refraction at air/prism interfaces are not shown.

Polarizing Illumination Systems

In accordance with the present invention of dual-mode 3D projection displays, a polarizing illumination system is used to generate two streams of polarized color light. The polarizing illumination system can be chosen from one of the following selections which are described below and are incorporated in the embodiments of the present invention.

Figure 7A:
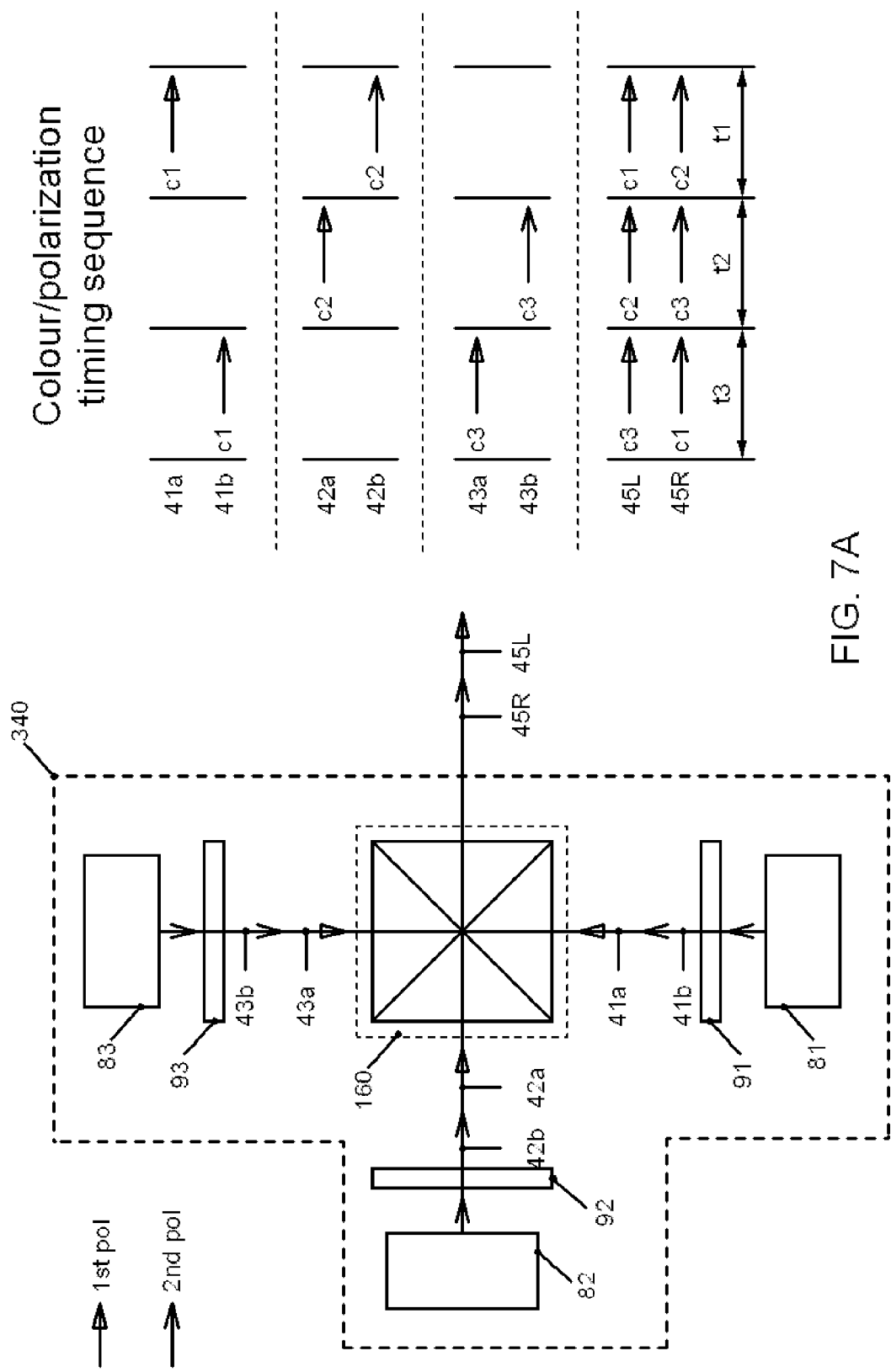
FIG. 7A is a schematic view of the first type polarizing illumination system in accordance with the present invention having three light source sub-systems, three polarization converting devices and a x-cube or x-plate color combining device.
Figure 7B:
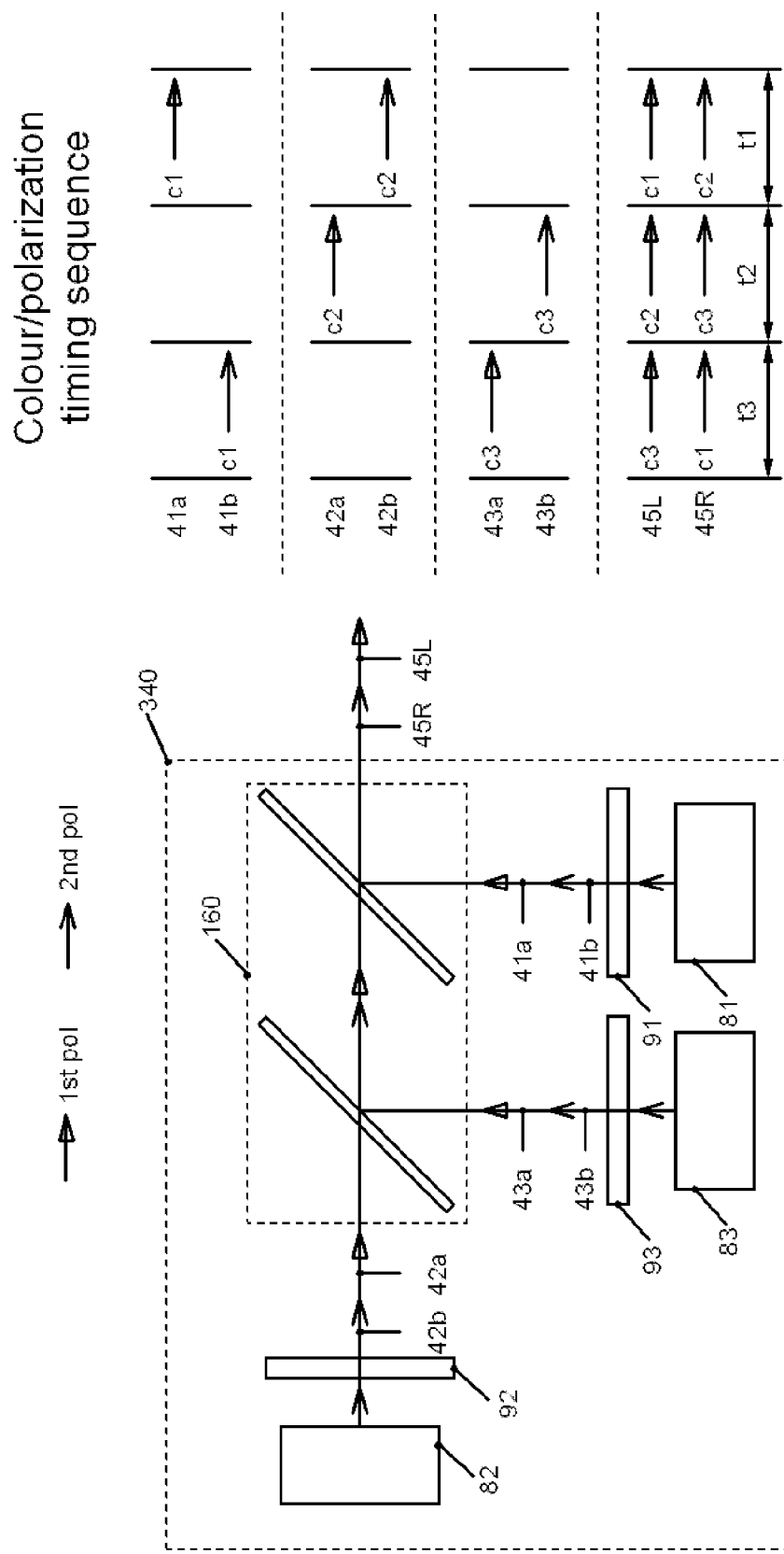
FIG. 7B is a schematic view of another first type polarizing illumination system in accordance with the present invention having three light source sub-systems, three polarization converting devices and two dichroic color filters.

The first type of polarizing illumination system 340 having two output sub-beams 45L and 45R as shown in FIGS. 7A and 7B comprises of three color light source sub-systems 81, 82 and 83 that emit light in color c1, c2 and c3, respectively; three polarization converting devices 91, 92 and 93 after each respective color light source sub-system and a color combining device 160. The colors c1, c2 and c3 can be red, green and blue primary colors, or any other color combinations. Each color c1, c2 and c3 can consist of sub colors. For example, color c1 may represent two red colors: R1 and R2, color c2 may represent two green colors: G1 and G2 and color c3 may represent two blue colors: B1 and B2. The light source sub-systems each can consist of a single or multiple color light emitting diodes or lasers either emitting identical colors or sub-colors. The polarization state of the light from each of the three color light source sub-systems, that may have an additional polarizer or a polarization recovery scheme, is either in a first or a second polarization state (for simplicity, a second polarization state is shown in FIGS. 7A and 7B and used in the following description). The first or second polarizations are orthogonal to each other. The three polarization converting devices 91, 92 and 93 are placed after the corresponding light source sub-systems 81, 82 and 83. The polarization converting devices can be based on birefringent materials such as liquid crystal with transparent electrodes or any other materials or schemes that can provide similar functions. The polarizing converting devices can switch quickly between at least two operation modes electronically. In the first operation mode, they rotate the polarization state of the incident light from the first polarization to the second polarization or vice versa. In the second operation mode, they transmit the incident light without changing its polarization state. In another operation mode, the polarization converting device can output light having both the first and second polarizations. Thus, the output light beams from the polarization converting device 91, 92 and 93 have two sub-beams each: 41*a* and 41*b*, 42*a* and 42*b*, 43*a* and 43*b*, respectively. The set of the sub-beams 41*a*, 42*a* and 43*a* are in the first polarization, and the set of sub-beams 41*b*, 42*b* and 43*b* is in the second polarization. The color combining device 160 is used to combing the three color beams into a single output beam. In FIG. 7A, the color combining device 160 is an x-cube or x-plate with dichroic color filter coatings. In FIG. 7B, a different color combining device 160 is used to combine colors and consists of two dichroic color filter plates. The set of the sub-beams 41*a*, 42*a* and 43*a* form the output sub-beam 45L in the first polarization. The set of the sub-beams 41*b*, 42*b* and 43*b* form the output sub-beam 45R in the second polarization.

The light source sub-systems 81, 82 and 83 working in synchronization with the polarization converting device 91, 92 and 93 can generate the two output sub-beams 45L and 45R with two respective repeating color sequences $\{c_1^1, \ldots, c_i^1, \ldots, c_n^1\}$ and $\{c_1^2, \ldots, c_i^2, \ldots, c_n^2\}$ where colors $c_i^1$ and $c_i^2$ are present in time interval t, and n represents the number of time intervals. Each color sequence can form a full color illumination time sequentially. Although colors $c_i^1$ and $c_i^2$ can be the same color in a interval $t_i$, it is advantageous for them to be different so that light efficient dual-mode projection displays in accordance with the present invention can be made.

Examples of the repeating color sequences are shown in FIGS. 7A and 7B. In time interval t1, the light source sub-system 83 is off; the light source sub-system 81 is on and the polarization converting device makes the output light in the first polarization; and the light source sub-system 82 is also on but the polarization converting device makes the output beam in the second polarization. Thus, in time interval t1, the output sub-beam 45L is in color c1 with the first polarization, and the sub-beam 45R is in color c2 with the second polarization. In time interval t2, the light source sub-system 81 is off; the light source sub-system 82 is on and the polarization converting device switches the output light to the first polarization; and the light source sub-system 83 is also on but the polarization converting device makes the output beam in the second polarization. Thus, in time interval t2, the output sub-beam 45L is in color c2 with the first polarization, and the sub-beam 45R is in color c3 with the second polarization. In time interval t3, the light source sub-system 82 is off; the light source sub-system 81 is on and the polarization converting device makes the output light in the second polarization; and the light source sub-system 83 is also on but the polarization converting device switches the output beam to the first polarization. Thus, in time interval t3, the output sub-beam 45L is in color c3 with the first polarization, and the sub-beam 45R is in color c1 with the second polarization. Thus, for any given interval, t1, t2 and t3, two light source sub-systems are on and the output sub-beams 45L and 45R have different colors in orthogonal polarizations.

Many different color sequences or additional time intervals can be used as well. For example, the first and second color sequences can be {R, G, B} and {G, B, R} similar to those shown in FIGS. 7A and 7B. In another example, the first and second color sequences can be {R1, G1, B1} and {G2, B2, R2}, both color sequences form full color time sequential illumination but with different primary color sets. The time sequences of the output sub-beams are repeated. Blanking between two time intervals may be used because of some operation considerations such as to minimize cross-talks in a stereo dual-mode projector in the present invention.

Figure 7C:
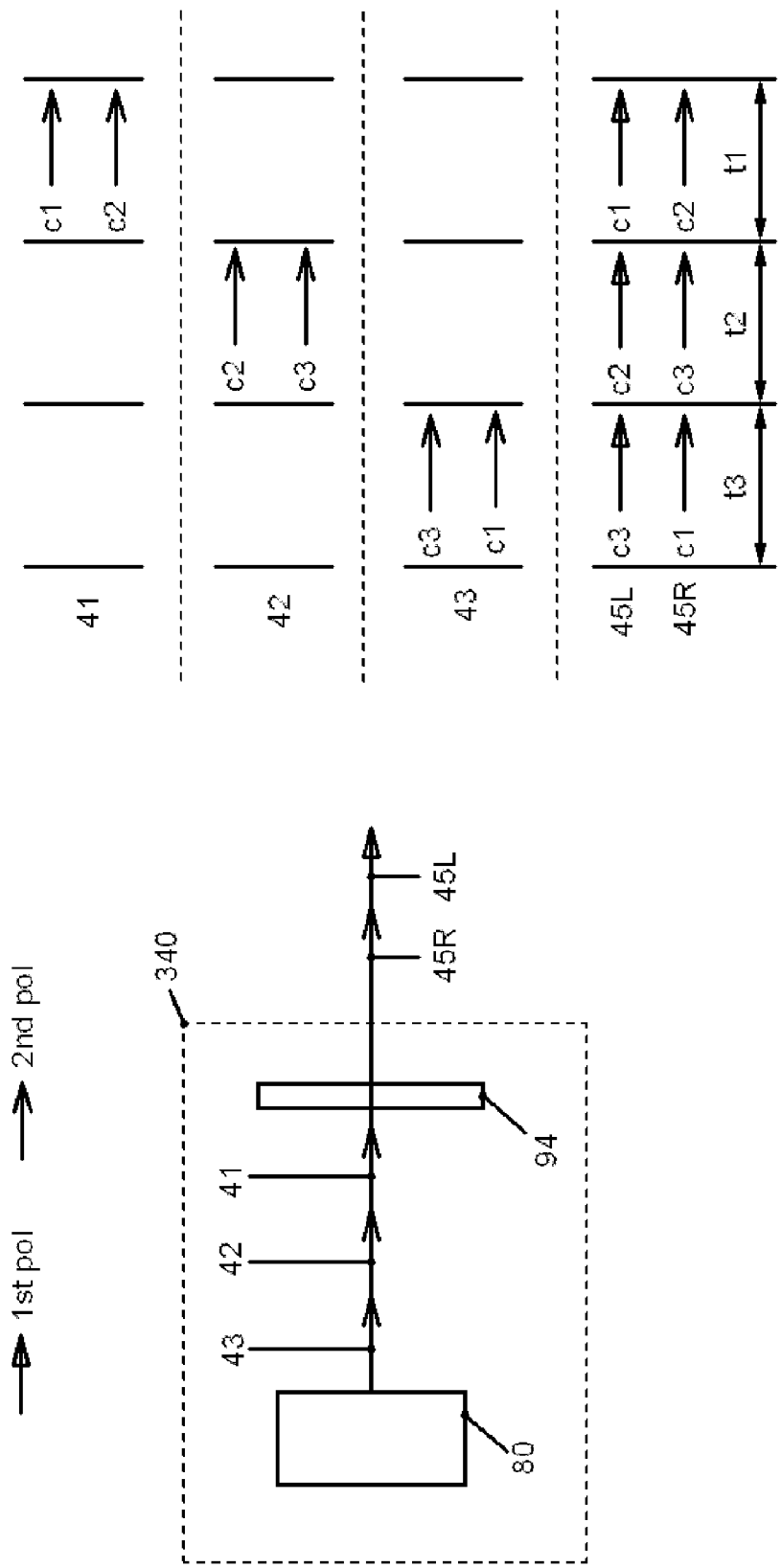
FIG. 7C is a schematic view of the second type polarizing illumination system in accordance with the present invention having a light source sub-system and a color selective polarization converting device.
Figure 7D:
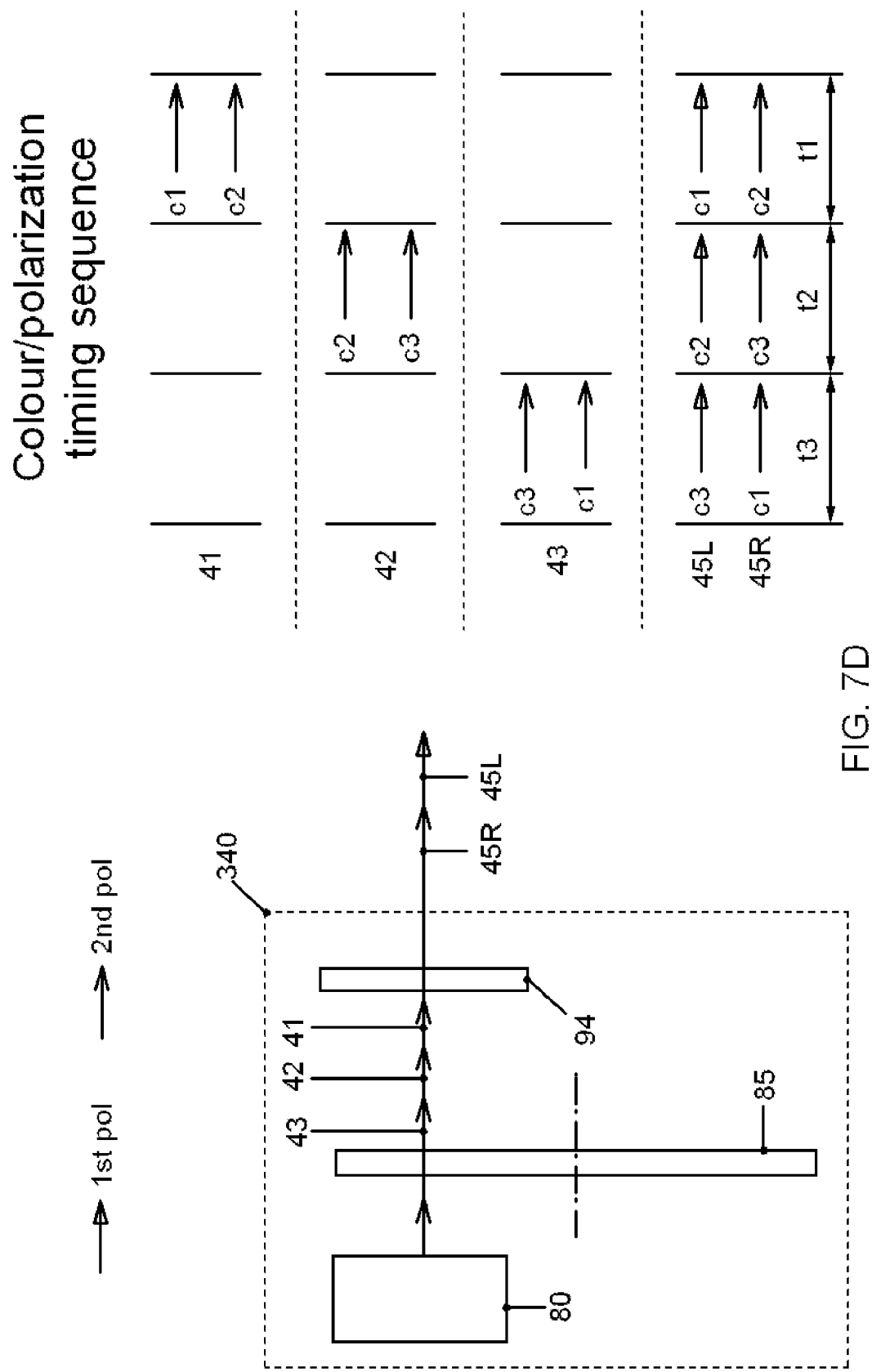
FIG. 7D is a schematic view of another second type polarizing illumination system in accordance with the present invention having a light source sub-system, a rotating color filter wheel and a color selective polarization converting device.

The second type of polarizing illumination system 340 having two output sub-beams 45L and 45R as shown in FIGS. 7C and 7D comprises of a light source sub-system 80 that emits light consisting of at least three colors c1, c2 and c3 and a color selective polarization converting device 94. The colors c1, c2 and c3 can be red, green and blue primary colors, or any other color combinations. Each color c1, c2 and c3 can consist of sub colors. For example, color c1 may represent two red colors: R1 and R2, color c2 may represent two green colors: G1 and G2 and color c3 may represent two blue colors: B1 and B2. The light source sub-system can consist of a single or multiple color light emitting diodes or lasers either emitting identical colors or sub-colors. In FIG. 7C, the light source sub-system 80 having an output beam 41, 42 and 43 can consist of multiple color light emitting diodes or lasers that can operate in a pulsing mode. In FIG. 7D, the light source system 80 emits white light, having either a polarizer or polarization recovery scheme, and an additional rotating color filter wheel 85 is added after the light source sub-system to generate color light in sequence. The polarization state of the output beam 41, 42 and 43 is either in a first or a second polarization state (for simplicity, a second polarization state is shown in FIGS. 7C and 7D and used in the following description). The first or second polarizations are orthogonal to each other. The color selective polarization converting device 94 can selectively rotate the polarization state of the incident light in colors c1, c2 or c3 from the first polarization to the second polarization or vice versa, but keep the polarization states of other color light unchanged. Such a color selective polarization converting device can be made of birefringent color selective filters with transparent electrodes. The fast color and polarization state switching is achieved electronically. Thus, the output light beam from the color selective polarization converting device 94 has two sub-beams each: 45L and 45R in the first and second polarizations respectively.

The light source sub-system 80, working in synchronization with the color selective polarization converting device 94, can also generate the two output sub-beams 45L and 45R with two respective repeating color sequences $\{c_1^1, \ldots, c_i^1, \ldots c_n^1\}$ and $\{c_1^2, \ldots, c_i^2, \ldots, c_n^2\}$ where colors $c_i^1$ and $c_i^2$ are present in time interval $t_i$ and n represents the number of time intervals. Each color sequence can form a full color illumination time sequentially. Although colors $c_i^1$ and $c_i^2$ can be the same color in a time interval $t_i$, it is advantageous for them to be different so that light efficient dual-mode projection displays in accordance with the present invention can be made.

Examples of the repeating color sequences are shown in FIGS. 7C and 7D. In time interval t1, the output light beams 41, 42 and 43 from the light source sub-system 80 consists of light in both colors c1 and c2 in the second polarization. The color selective polarization converting device 94 then converts the polarization state of the light in color c1 from the second polarization to the first polarization but keeps the polarization state of the light in color c2 unchanged. Thus, in time interval t1, the output sub-beam 45L is in color c1 with the first polarization, and the sub-beam 45R is in color c2 with the second polarization. In time interval t2, the output light beams 41, 42 and 43 from the light source sub-system 80 consists of light in both colors c2 and c3 in the second polarization. The color selective polarization converting device 94 then converts the polarization state of the light in color c2 from the second polarization to the first polarization but keeps the polarization state of the light in color c3 unchanged. Thus, in time interval t2, the output sub-beam 45L is in color c2 with the first polarization, and the sub-beam 45R is in color c3 with the second polarization. In time interval t3, the output light beams 41, 42 and 43 from the light source sub-system 80 consists of light in both colors c3 and c1 in the second polarization. The color selective polarization converting device 90 then converts the polarization state of the light in color c3 from the second polarization to the first polarization but keeps the polarization state of the light in color c1 unchanged. Thus, in time interval t3, the output sub-beam 45L is in color c3 with the first polarization, and the sub-beam 45R is in color c1 with the second polarization. Thus, for any given interval, t1, t2 and t3, light with two colors from the light source sub-system 80 are present and the output sub-beams 45L and 45R have different colors in orthogonal polarizations.

Many different color sequences or additional time intervals can be used as well. For example, the first and second color sequences can be {R, G, B} and {G, B, R} similar to those shown in FIGS. 7C and 7D. In another example, the first and second color sequences can be {R1, G1, B1} and {G2, B2, R2}, both color sequences form full color time sequential illumination but with different primary color sets. The time sequences of the output sub-beams are repeated. Blanking between two time intervals may be used because of some operation considerations such as to minimize cross-talks in a stereo dual-mode projector in the present invention.

First Type of Embodiments

Figure 8A:
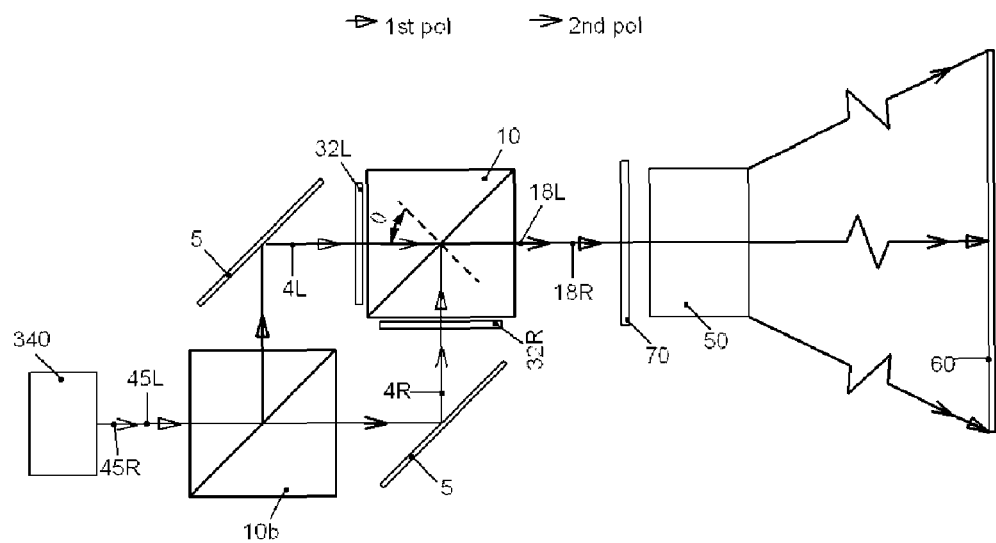
FIG. 8A is a schematic view of the first type embodiment of a dual-mode 3D projector in accordance with the present invention having two transmissive LCD micro-display panels and a polarizing beam-splitter operating at a central angle of incidence 45°.
Figure 8B:
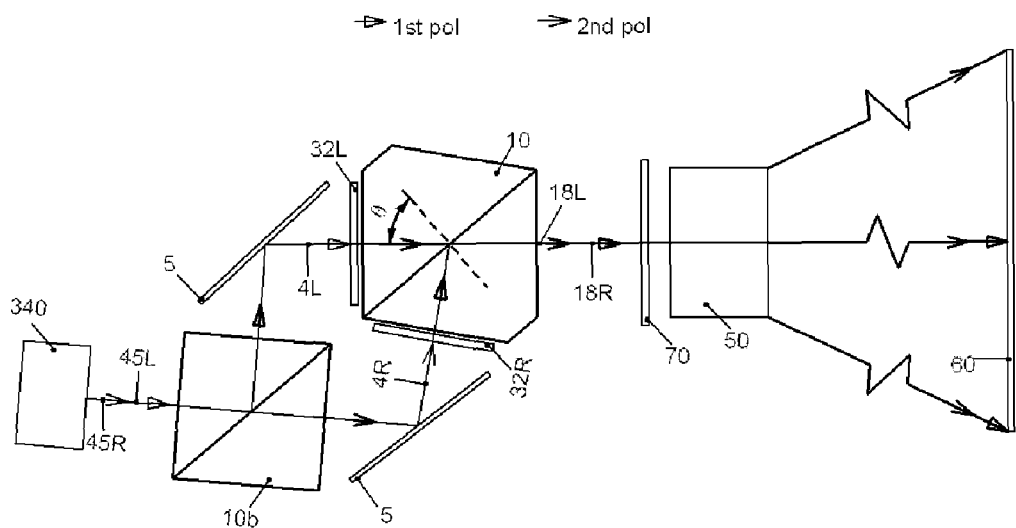
FIG. 8B is a schematic view of another first type embodiment of a dual-mode 3D projector in accordance with the present invention having two transmissive LCD micro-display panels and a polarizing beam-splitter operating at a central angle of incidence greater than 45°.
Figure 8C:
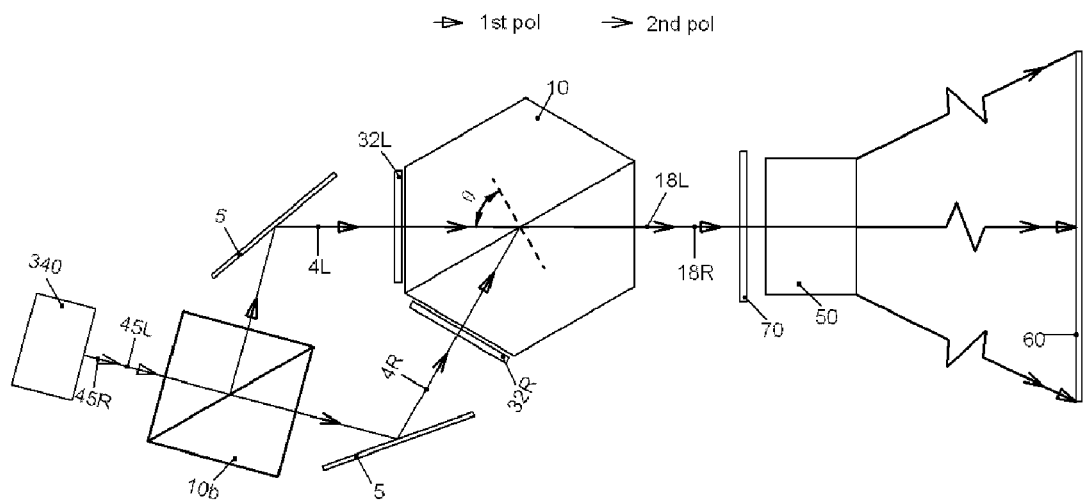
FIG. 8C is a schematic view of yet another first type embodiment of a dual-mode 3D projector in accordance with the present invention having two transmissive LCD micro-display panels and a polarizing beam-splitter operating at a central angle of incidence substantially greater than 45°.

The first type of the embodiments of the dual-mode 3D projection display systems in accordance with the present invention as shown in FIGS. 8A-8C, comprises of a polarizing illumination system 340; two polarizing beam-splitter 10 and 10b; two transmissive LCD micro-display panels 32L and 32R; two mirrors; an optional waveplate 70, a projection lens 50 and an optional projection screen 60. The micro-display panels 32L and 32R are transmissive micro-display panels 32 as described in the preamble. The polarizing illumination system 340 is selected from the first and second types of the polarizing illumination systems described in the preamble. In the FIGS. 8A-8C and the following explanations, both polarizing beam-splitters 10 and 10b are assumed to reflect light in the first polarization and transmit light in the second polarization. The polarizing beam-splitters 10 and 10b are selected from polarizing devices described in the preamble. The first and second polarizations can be s- and p-polarized, respectively, or vice versa. In practice the light incident on the polarizing beam-splitters and micro-display panels contain a range of angles, only the central ray directions are shown in all figures in the specifications. In the embodiment shown in FIG. 8A, the central angle of incidence 8 of light at the beam-splitting surface of the polarizing beam-splitter 10 is 45°; in the embodiment shown in FIG. 8B, the central angle of incidence is slightly larger than 45°; and in the embodiment shown in FIG. 8C, the central angle of incidence is substantially larger than 45°.

The polarized output sub-beams 45L and 45R from the polarizing illumination system 340 are separated into two beams by the polarizing beam-splitter 10b. The sub-beam 45L in the first polarization is reflected by the polarizing beam-splitter and becomes beam 4L and the sub-beam 45R is transmitted by the polarizing beam-splitter and becomes beam 4R. The polarized light beam 4L is incident upon the micro-display panel 32L. Images are then encoded by the micro-display onto the output light by modulating the polarization states of the incident light. For "on" pixels, the polarization state of the image light is rotated to the second polarization. Thus the "on" pixel image light passes through the polarizing beam-splitter 10 and becomes beam 18L. It then passes through the optional waveplate 70 and is then projected onto the screen 60 by the projection lens 50. For "off" pixels, the polarization state of the output image light is unchanged, is still in the first polarization, thus it is absorbed by the internal polarizer within the microdisplay panel 32L and any residual transmitted light from the "off" pixels is further reduced by the polarizing beam-splitter 10 by reflecting the light out of the imaging path of the projection lens. Therefore, very high contrast images can be obtained.

Similarly, the polarized light beam 4R in the second polarization is incident upon the micro-display panel 32R. Images are then encoded by the micro-display onto the output light by modulating the polarization states of the incident light. For "on" pixels, the polarization state of the image light is rotated to the first polarization. Thus the "on" pixel image light is reflected by the polarizing beam-splitter 10 and becomes beam 18R. It passes through the optional waveplate 70 and is then projected onto the screen 60 by the projection lens 50. For "off" pixels, the polarization state of the output image light is unchanged, is still in the second polarization, thus it is absorbed by the internal polarizer within the microdisplay panel 32R and any residue light from the "off" pixels is further reduced by the polarizing beam-splitter 10 by transmitting the light out of the imaging path of the projection lens. Therefore, very high contrast images can also be obtained.

The operation of the polarizing illumination system 340 has been described in detail in the preamble. The transmissive panel 32L encodes a first set of color images that are synchronized with the first color sequences $\{c_1^1, \ldots, c_i^1, \ldots, c_n^1\}$ of the light from sub-beam 45L, and the color images form a first full color image in the second polarization. The transmissive panel 32R encodes a second set of color images that are synchronized with the second color sequences $\{c_1^2, \ldots, c_i^2, \ldots, c_n^2\}$ of the light from sub-beam 45L, and the color images form a second full color image in the first polarization.

The first type of the embodiments in accordance with the present invention of the dual-mode 3D projection displays can operate either in a passive 3D mode or in an active 3D mode. In a first passive 3D mode, polarizing 3D glasses and a polarization preserving screen are used for viewing the 3D images. In the second passive 3D mode, color filter 3D glasses and any screens are used for viewing 3D images. In the active 3D mode, liquid crystal shutter glasses are used with any screen for viewing 3D images.

The first passive 3D mode is described as follows with the help of FIGS. 8A-8C and 10A. The 3D stereo display mode is realized by using two orthogonal polarizations for the left- and right eye-images. In FIG. 10A, an example of simple first and second color sequences is illustrated. As shown in FIG. 10A, the output sub-beam 45L from the polarizing illumination 340 is in the first polarization and has the first color sequence {c1, c2, c3} corresponding to time intervals {t1, t2, t3}, respectively; the output sub-beam 45R from the polarizing illumination system 340 is in the second polarization and has the second color sequence {c2, c3, c1} with time intervals {t1, t2, t3}, respectively. The colors c1, c2 and c3 are primary colors, such as red, green and blue, which are used to generate the first and second full colors images. The image signals fed to the micro-display panels are synchronized in color with the output light from the polarizing illumination system, thus the image light 18L from the micro-display panel 32L is in the second polarization and consists of a first set of color images in color sequence {c1, c2, c3}; and the image light 18R from the micro-display panel 32R is in the first polarization and consists of a second set of color images in color sequence {c2, c3, c1} as shown in FIG. 10A. Since the image light from the micro-display panel 32L is in the second polarization and the image light from the micro-display panel 32R is in the first polarization, if left-eye and right-eye image signals are fed to the two micro-display panels 32L and 32R, respectively (or vice versa), by wearing matching polarizing 3D glasses, viewers will be able to see 3D stereoscopic images on screen. In addition, if identical 2D image signals are fed to the two microdisplay panels 32L and 32R, normal 2D images are then displayed onscreen. Both 2D and 3D operation modes are highly light efficient. In switching from 2D to 3D mode, no light is wasted, the available light is equally shared between the left- and right-eye images. The 2D and 3D modes can be switched electronically and no hardware needs to be added or removed during switching. This operation mode is advantageous in some applications because it allows the use of inexpensive polarizing 3D glasses.

The optional waveplate 70 can be installed either before or after the projection lens to convert the first and second polarization linear polarized light to the left- and right-circular polarized light respectively, or vice versa. Viewers can wear a pair of circular polarizing glasses and will then be able to view the 3D images without introducing left- and right-eye image cross-talk when their head is tilted from side to side.

In the second passive 3D mode, the 3D stereo display mode is realized by different first and second sets of color images for the left- and right eye-images. For example, the first and second color sequences can be {R1, G1, B1} and {G2, B2, R2}, respectively, where each sequence forms a full color set but the colors R1 and R2, G1 and G2, B1 and B2 are separated in the wavelength spectrum. 3D color filter glasses that match respective color images (blocking one set of colors and passing the other set colors for each eye) are needed for viewers to see 3D images.

Figure 10B:
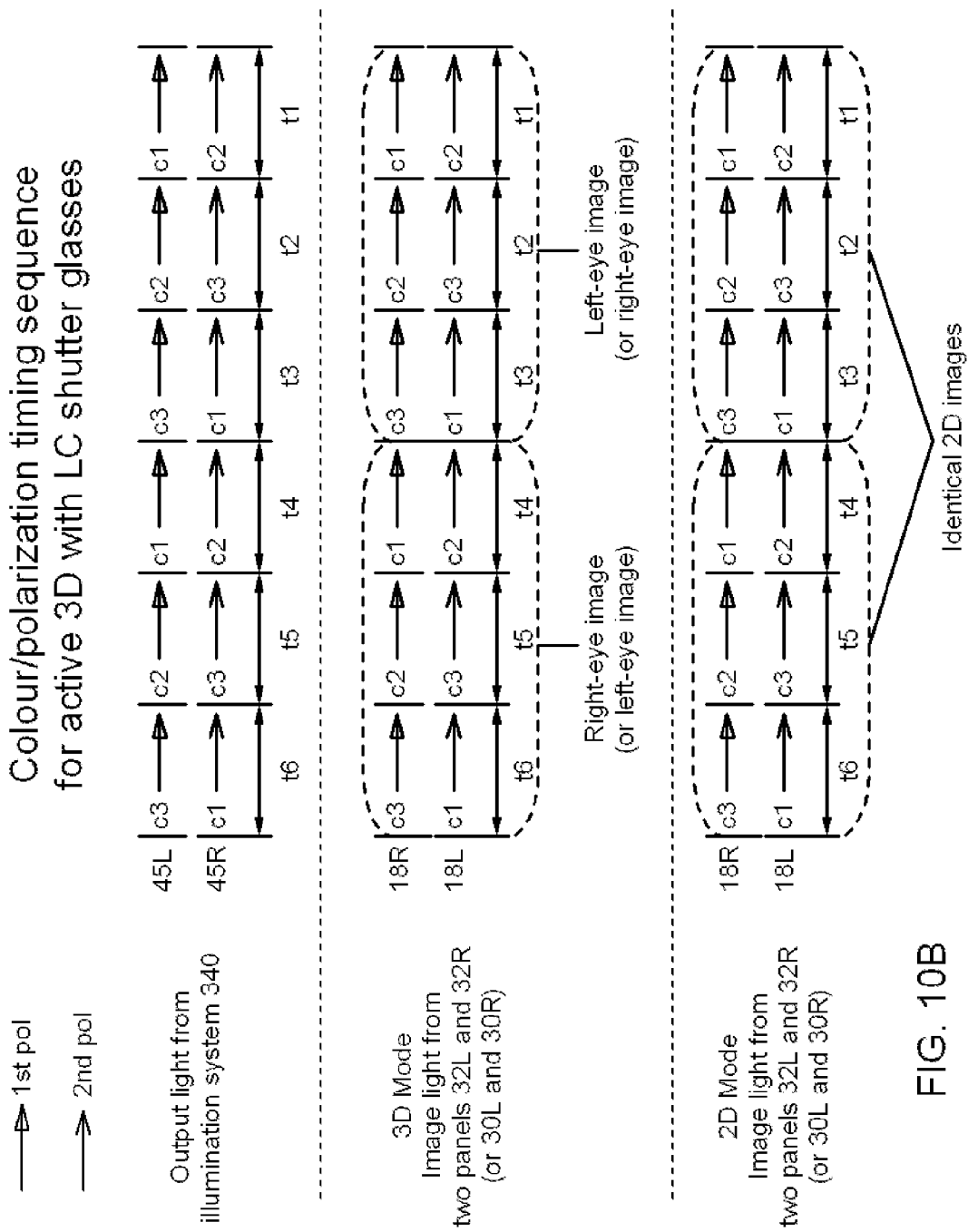
FIG. 10B shows the color and polarization sequences of the output light from the illumination system 340 and the image light from the two micro-display panels 32L and 32R (or 30L and 30R) for displaying 2D and 3D images in the active operation mode with LC shutter glasses.

The active 3D mode is described as follows with the help of FIGS. 8A-8C and 10B. The 3D stereo display mode is realized by displaying the left- and right eye-images time sequentially. Again, for simplicity, only a simple case of the first and second color sequences are illustrated in FIG. 10B. As shown in FIG. 10B, the output sub-beam 45L is in the first polarization and has the first color sequence {c1, c2, c3, c1, c2, c3} with time intervals {t1, t2, t3, t4, t5, t6}, respectively; the output sub-beam 45R is in the second polarization and has a second color sequence {c2, c3, c1, c2, c3, c1} with time intervals {t1, t2, t3, t4, t5, t6}, respectively. The colors c1, c2 and c3 are primary colors, such as red, green and blue, which can be used to generate full colors images. The image signals fed to the micro-display panels are synchronized in color with the output light from the polarizing illumination system, thus the image light 18L from the micro-display panel 32L is in the second polarization and consists of the first set of color images in the first color sequence; and the image light 18R from the micro-display panel 32R is in the first polarization and consists of the second set of color images in the second color sequence as shown in FIG. 10B. To display active 3D images, during the intervals t1 to t3, left-eye image signals are fed to both micro-display panels 32L and 32R, during the intervals t4 to t6, right-eye image signals are fed to both micro-display panels. There may be a blank interval between interval t3 and t4, or between any of the time intervals, for reducing cross-talk between left- and right-eye images, or between color images, caused by the finite time it takes to turn-off an image on a micro display and then turn-on a new image on the same micro display or by slow response time of the LC crystal shutters. The left- and right-eye image light consists of both the first and second polarizations. The switching between the left- and right-eye images are fast enough, for example, 120 frames per second, by wearing synchronized LC shutter glasses, viewers will be able to see 3D stereoscopic images on screen. In addition, if identical 2D image signals are fed to the microdisplay panels 30L and 30R, normal 2D images are then displayed on screen. The 2D and 3D modes can be switched electronically and no hardware needs to be added or removed during switching. This operation mode is advantageous in some applications because it allows the use of any type of screens.

In the first type of the embodiments of the present invention of dual-mode 3D projection displays, because at any given time, at least two colors are displayed simultaneously, thus the light efficiency is almost doubled compared to conventional time sequential color displays which only display one color at a time. This is especially true if the first type polarizing illumination system, with polarizing converting devices, is used because the polarizing converting device can be quite light efficient, with transmittance as high as 90%. In the second type polarizing illumination system, a color selective polarization converting device is used, because the required transparent electrodes have absorption and the color transmission bands are also reduced due to the use of color selective filters, the transmittance of currently available color selective polarization converting device is thus lower than that of the polarization converting device in the first type illumination system. However, there still exit some gain in light efficiency compared to conventional time sequential color displays.

It is obvious to a person skilled in the art that different color sequences and some additional common optical components, for example lens, may be needed in some of the above embodiments and these additional components are not shown in the figures. Without departing from the spirit of the present invention, other embodiments with different arrangements and layouts of the components can be used as well.

Second Type of Embodiments

The second type of the embodiments of the dual-mode 3D projection display systems in accordance with the present invention as shown in FIGS. 9A-9F, comprises of a polarizing illumination system 340; a polarizing beam-splitter 10; two reflective micro-display panels 30L and 30R; an optional waveplate 70, a projection lens 50 and an optional projection screen 60. The micro-display panels 30L and 30R are selected from the reflective micro-display panels 30 as described in the preamble. In the embodiments shown in FIGS. 9D-9F, an additional plate mirror 5 or a prism mirror 5 (shown in short dashed lines) is added before microdisplay panels 30L and a matching optical path or prism 5R (shown in short dashed lines) is added before the micro-display panel 30R. Clearly, the mirror can be added before micro-display panel 30R instead of before micro-display panel 30L. The polarizing illumination system 340 is selected from the first and second types of the polarizing illumination systems described in the preamble. The polarizing beam-splitter 10 reflects light in the first polarization and transmits light in the second polarization, or vice versa. For simplicity, in the FIGS. 9A-9F, and the following explanations, polarizing beam-splitter 10 is assumed to reflect light in the first polarization and transmit light in the second polarization. The polarizing beam-splitter 10 is selected from polarizing devices described in the preamble. The first and second polarizations can be s- and p-polarized, respectively, or vice versa. In the embodiment shown in FIGS. 9A and 9D, the central angle of incidence of light at the beam-splitting surface of the polarizing beam-splitter 10 is 45°; in the embodiment shown in FIGS. 9B and 9E, the central angle of incidence is slightly larger than 45°; and in the embodiment shown in FIGS. 7C and 9F, the central angle of incidence is substantially larger than 45°.

The polarized output sub-beams 45L and 45R from the polarizing illumination system 340 are separated into two beams by the polarizing beam-splitter 10. The sub-beam 45L in the first polarization is reflected by the polarizing beam-splitter and becomes beam 19L and the sub-beam 45R is transmitted by the polarizing beam-splitter and becomes beam 19R. The polarized light beam 19L is incident upon the micro-display panel 30L. Images are then encoded by the micro-display onto the output light. For "on" pixels, the polarization state of the image light is rotated to the second polarization. Thus the "on" pixel image light passes through the polarizing beam-splitter 10 and becomes beam 18L. It then passes through the optional waveplate 70 and is then projected onto the screen 60 by the projection lens 50. In the case where the micro-display panel 30L is a LCOS panel, the "off" pixels do not change the polarization state of incident light, thus the reflected "off" light from the micro-display panel 30L is sent back by the polarizing beam-splitter 10 along the direction of the light source. In the case where the micro-display panel 30L is a MEM panel, the "off" pixels reflect the incident light at different direction from the "on" pixel light, the reflected "off" light is absorbed by a light absorber and it does not reach to the projection lens.

Similarly, the polarized light beam 19R is incident upon the micro-display panel 30R. Images are then encoded by the micro-display onto the output light. For "on" pixels, the polarization state of the image light is rotated to the first polarization. Thus the "on" pixel image light is reflected by the polarizing beam-splitter 10 and becomes beam 18R. It passes through the optional waveplate 70 and is then projected onto the screen 60 by the projection lens 50. In the case where the micro-display panel 30R is a LCOS panel, the "off" pixels do not change the polarization state of incident light, thus the reflected "off" light from the micro-display panel 30R is sent back by the polarizing beam-splitter 10 along the direction of the light source. In the case where the micro-display panel 30R is a MEM panel, the "off" pixels reflect the incident light at different direction from the "on" pixel light, the reflected "off" light is absorbed by a light absorber and it does not reach to the projection lens.

The operation of the polarizing illumination system 340 has been described in detail in the preamble. The transmissive panel 30L encodes a first set of color images that are synchronized with the first color sequences $\{c_1^1, \ldots, c_i^1, \ldots, c_n^1\}$ of the light from sub-beam 45L, and the color images form a first full color image in the second polarization. The transmissive panel 30R encodes a second set of color images that are synchronized with the second color sequences $\{c_1^2, \ldots, c_i^2, \ldots c_n^2\}$ of the light from sub-beam 45L, and the color images form a second full color image in the first polarization.

The second type of the embodiments in accordance with the present invention of the dual-mode 3D projection displays can operate either in a passive 3D mode or in an active 3D mode. In a first passive 3D mode, polarizing 3D glasses and a polarization preserving screen are used for viewing the 3D images. In the second passive 3D mode, color filter 3D glasses and any screens are used for viewing 3D images. In the active 3D mode, liquid crystal shutter glasses are used with any screens for viewing 3D images.

The first passive 3D mode is described as follows with the help of FIGS. 9A-9F and 10A. The 3D stereo display mode is realized by using two orthogonal polarizations for the left- and right eye-images. In FIG. 10A, an example of simple first and second color sequences is illustrated. As shown in FIG. 10A, the output sub-beam 45L from the polarizing illumination system 340 is in the first polarization and has the first color sequence {c1, c2, c3} corresponding to time intervals {t1, t2, t3}, respectively; the output sub-beam 45R from the polarizing illumination system 340 is in the second polarization and has the second color sequence {c2, c3, c1} corresponding to time intervals {t1, t2, t3}, respectively. The colors c1, c2 and c3 are primary colors, such as red, green and blue, which are used to generate full colors images. The image signals fed to the micro-display panels are synchronized in color with the output light from the polarizing illumination system, thus the image light 18L from the micro-display panel 30L is in the second polarization and consists of the first set of color images in the first color sequence {c1, c2, c3}; and the image light 18R from the micro-display panel 30R is in the first polarization and consists of the second set of color images in the second color sequence {c2, c3, c1} as shown in FIG. 10A. Since the image light from the micro-display panel 30L is in the second polarization and the image light from the micro-display panel 30R is in the first polarization, if left-eye and right-eye image signals are fed to the two micro-display panels 30L and 30R, respectively (or vice versa), by wearing matching polarizing 3D glasses, viewers will be able to see 3D stereoscopic images on screen. In addition, if identical 2D image signals are fed to the two microdisplay panels 30L and 30R, normal 2D images are then displayed onscreen. Both 2D and 3D operation modes are highly light efficient. In switching from 2D to 3D mode, no light is wasted, the available light is equally shared between the left- and right-eye images. The 2D and 3D modes can be switched electronically and no hardware needs to be added or removed during switching. This operation mode is advantageous in some applications because it allows the use of inexpensive polarizing 3D glasses.

The optional waveplate 70 can be installed either before or after the projection lens to convert the first and second polarization linear polarized light to the left- and right-circular polarized light respectively, or vice versa. Viewers can wear a pair of circular polarizing glasses and will then be able to view the 3D images without introducing left- and right-eye image cross-talk when their head is tilted from side to side.

In the second passive 3D mode, the 3D stereo display mode is realized by different first and second sets of color images for the left- and right eye-images. For example, the first and second color sequences can be {R1, G1, B1} and {G2, B2, R2}, respectively, where each sequence forms a full color set but the colors R1 and R2, G1 and G2, B1 and B2 are separated in the wavelength spectrum. 3D color filter glasses that match respective color images (blocking one set of colors and passing the other set colors for each eye) are needed for viewers to see 3D images.

The active 3D mode is described as follows with the help of FIGS. 9A-9F and 10B. The 3D stereo display mode is realized by displaying the left- and right eye-images time sequentially. Again, for simplicity, only a simple case of the first and second color sequences are illustrated in FIG. 10B. As shown in FIG. 10B, the output sub-beam 45L is in the first polarization and has the first color sequence {c1, c2, c3, c1, c2, c3} with time intervals {t1, t2, t3, t4, t5, t6}, respectively; the output sub-beam 45R is in the second polarization and has a color sequence of {c2, c3, c1, c2, c3, c1} with time intervals {t1, t2, t3, t4, t5, t6}, respectively. The colors c1, c2 and c3 are primary colors, such as red, green and blue, which can be used to generate full the first and second sets of color images. The image signals fed to the micro-display panels are synchronized in color with the output light from the polarizing illumination system, thus the image light 18L from the micro-display panel 30L is in the second polarization and consists of the first set of color images in the first color sequence {c1, c2, c3, c1, c2, c3} with time; and the image light 18R from the micro-display panel 30R is in the first polarization and consists of the second set of color images in the second color sequence {c2, c3, c1, c2, c3, c1} with time as shown in FIG. 10B. To display active 3D images, during the intervals t1 to t3, left-eye image signals are fed to both micro-display panels 30L and 30R, during the intervals t4 to t6, right-eye image signals are fed to both micro-display panels. There may be a blank interval between interval t3 and t4, or between any of the time intervals, for reducing left- and right-eye, or color, image crosstalk that may occur due to the finite turn-on and turn-off time of the micro-displays. The left- and right-eye image light consist both the first and second polarizations. The switching between the left- and right-eye images are fast enough, for example, 120 frames per second, by wearing synchronized LCD shutter glasses, viewers will be able to see 3D stereoscopic images on screen. In addition, if identical 2D image signals are fed to the microdisplay panels 30L and 30R, normal 2D images are then displayed onscreen. The 2D and 3D modes can be switched electronically and no hardware needs to be added or removed during switching. This operation mode is advantageous in some applications because it allows the use of any type of screens.

In the second type of the embodiments of the present invention of dual-mode 3D projection displays, because at any given time, at least two colors are displayed simultaneously, thus the light efficiency is almost doubled compared to conventional time sequential color displays which only display one color at a time. This is especially true if the first type polarizing illumination system, with polarizing converting devices, is used because the polarizing converting device can be quite efficient with transmittance as high as 90%. In the second type polarizing illumination system, a color selective polarization converting device is used, because the required transparent electrodes have absorption and the color transmission bands are also reduced due to the use of color selective filters, the transmittance of currently available color selective polarization converting device is thus lower than that of the polarization converting device in the first type illumination system. However, there still exit some gain in light efficiency compared to conventional time sequential color displays.

When reflective MEM device panels, as described in the preamble, are used in the second type embodiments, different alignment approaches I, II, III and IV of the MEM devices with regard to the polarizing beam-splitter can be used, depending on the specifications of the MEM devices. In FIGS. 9A-9F, the output sub-beams 45L and 45R, and the beams 19L and 19R are based on the alignment II approach. When the first or second type MEM device panels are used, it is advantageous to use alignment III and IV to minimize the effective height of the MEM device panels and thus reduce the size of the PBS and the back focal length of the projection system. Although the third and fourth MEM devices are desired in the present invention, the only currently available MEM device type is the first type. In FIGS. 9A-9F, the dashed and dotted line show the beam paths for sub-beams 45L, 45R, 19L and 19R when the alignment III and IV between the MEM device panels and the PBS is used. The image light path 18L and 18R are the same for all reflective micro-display panels and all alignment approaches.

Figure 9A:
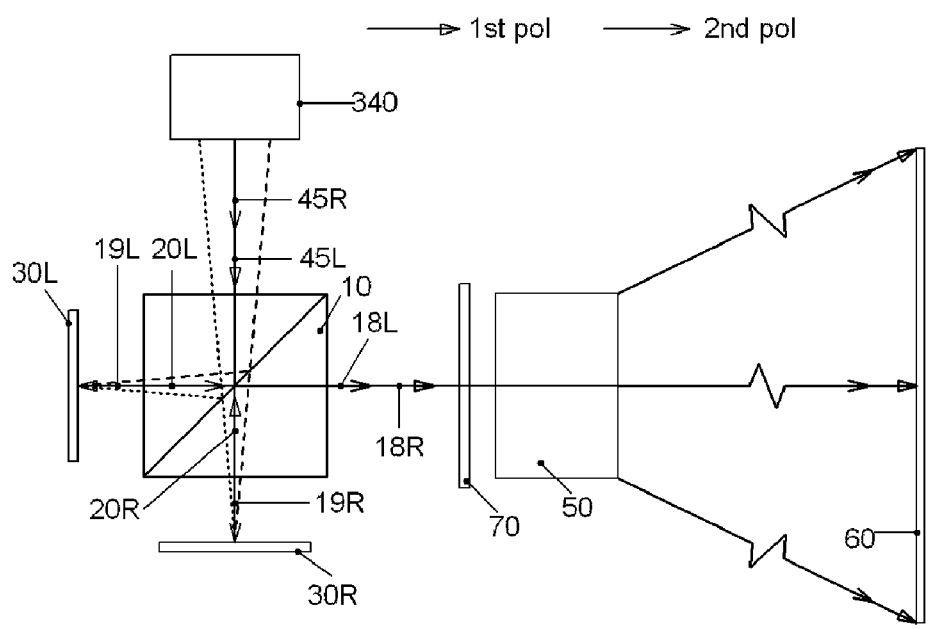
FIG. 9A is a schematic view of the second type embodiment of a dual-mode 3D projector in accordance with the present invention having two reflective micro-display panels, such as LCOS and MEM devices, and a polarizing beam-splitter operating at a central angle of incidence 45°.
Figure 9B:
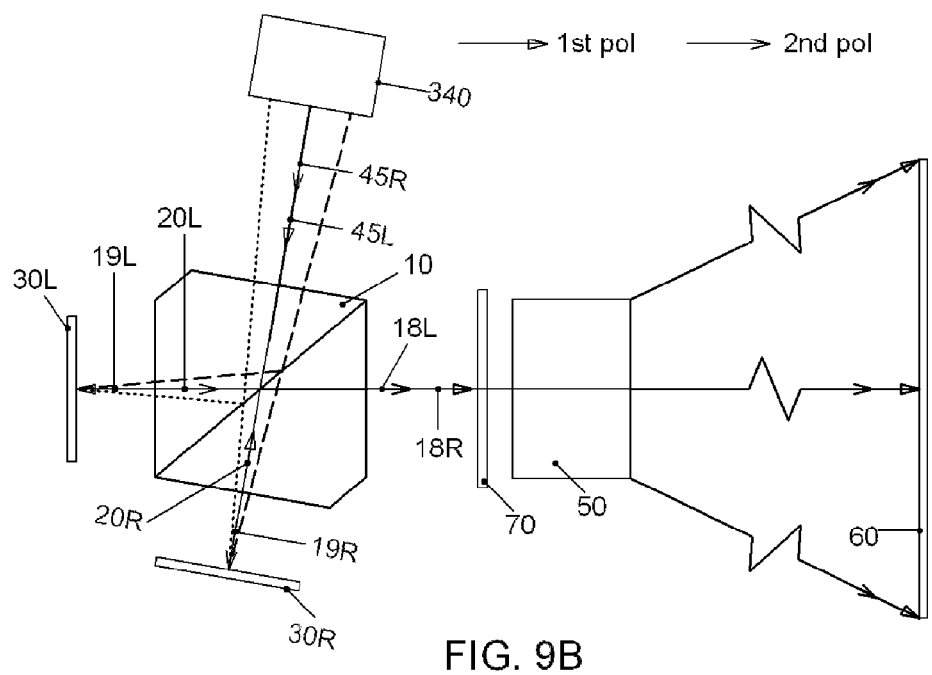
FIG. 9B is a schematic view of another second type embodiment of a dual-mode 3D projector in accordance with the present invention having two reflective micro-display panels, such as LCOS and MEM devices, and a polarizing beam-splitter operating at a central angle of incidence greater than 45°.
Figure 9C:
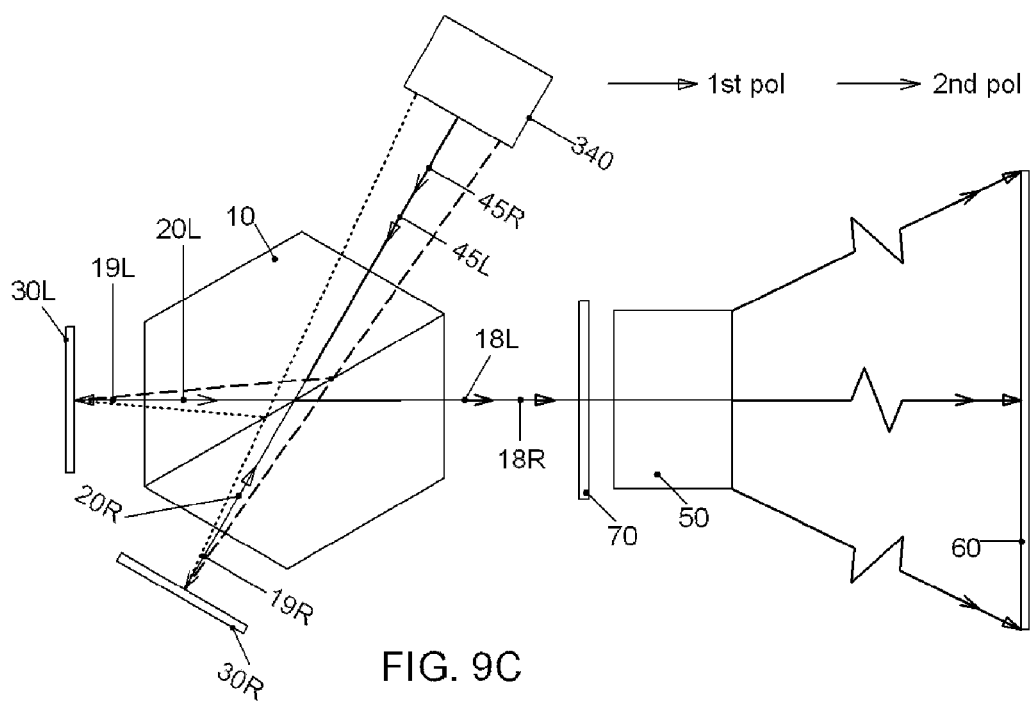
FIG. 9C is a schematic view of yet another second type embodiment of a dual-mode 3D projector in accordance with the present invention having two reflective micro-display panels, such as LCOS and MEM devices, and a polarizing beam-splitter operating at a central angle of incidence substantially greater than 45°.
Figure 9D:
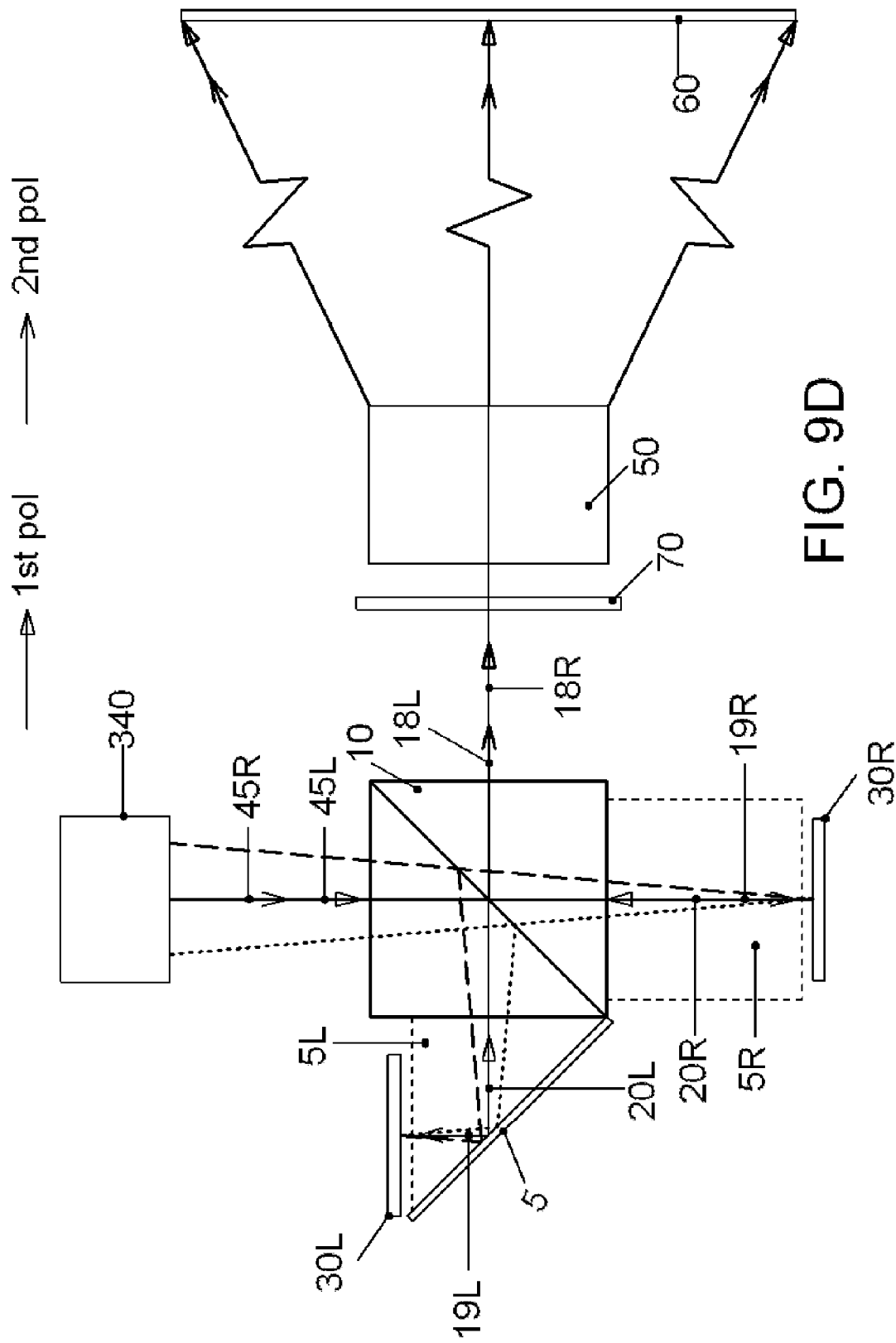
FIG. 9D is a schematic view of another second type embodiment of a dual-mode 3D projector in accordance with the present invention having two reflective micro-display panels, such as LCOS and MEM devices, a plate or prism mirror in one of the micro-display panel paths and a matching optical path or prism in the other micro-display panel path, and a polarizing beam-splitter operating at a central angle of incidence 45°.
Figure 9E:
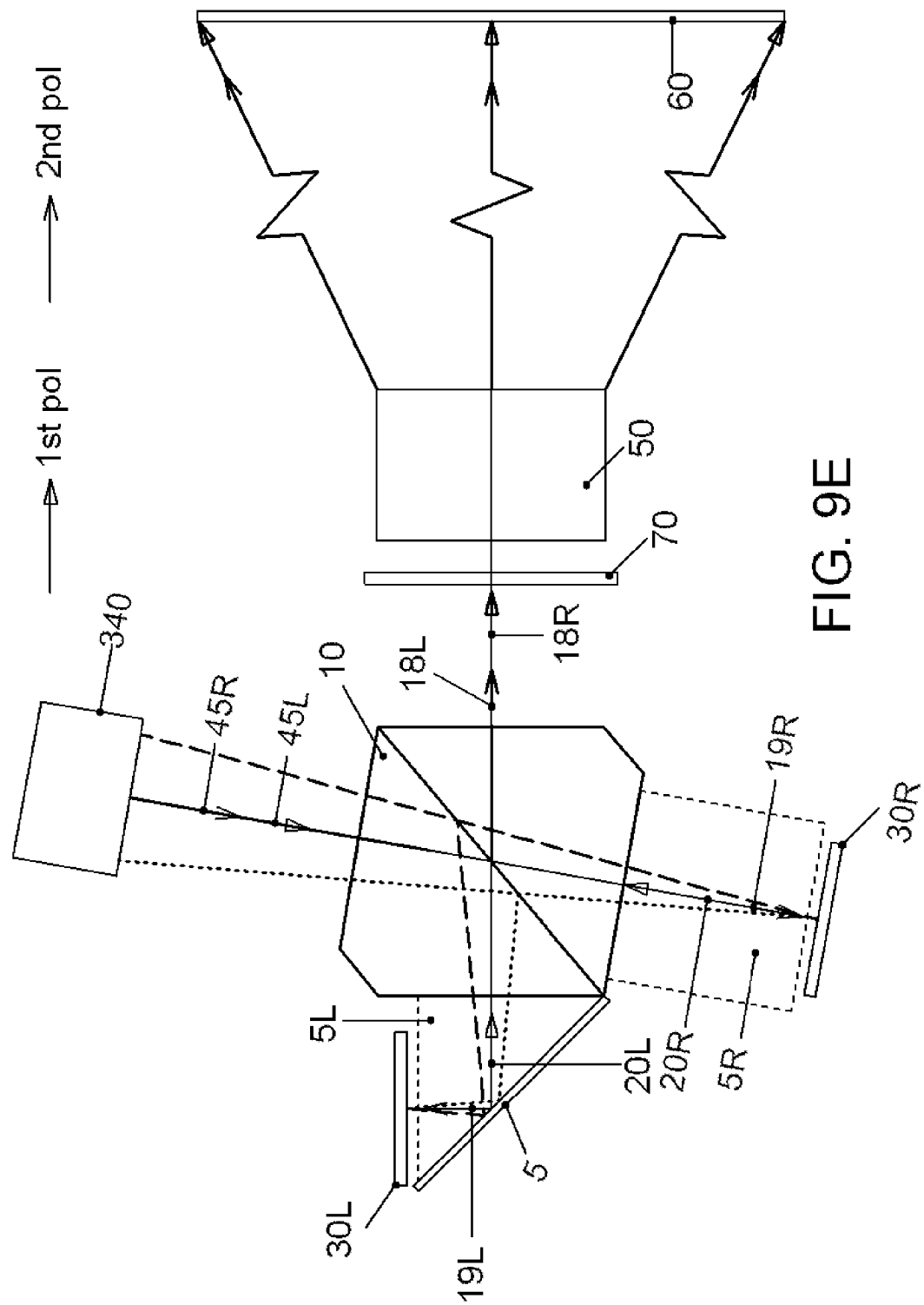
FIG. 9E is a schematic view of another second type embodiment of a dual-mode 3D projector in accordance with the present invention having two reflective micro-display panels, such as LCOS and MEM devices, a plate or prism mirror in one of the micro-display panel paths and a matching optical path or prism in the other micro-display panel path, and a polarizing beam-splitter operating at a central angle of incidence greater than 45°.
Figure 9F:
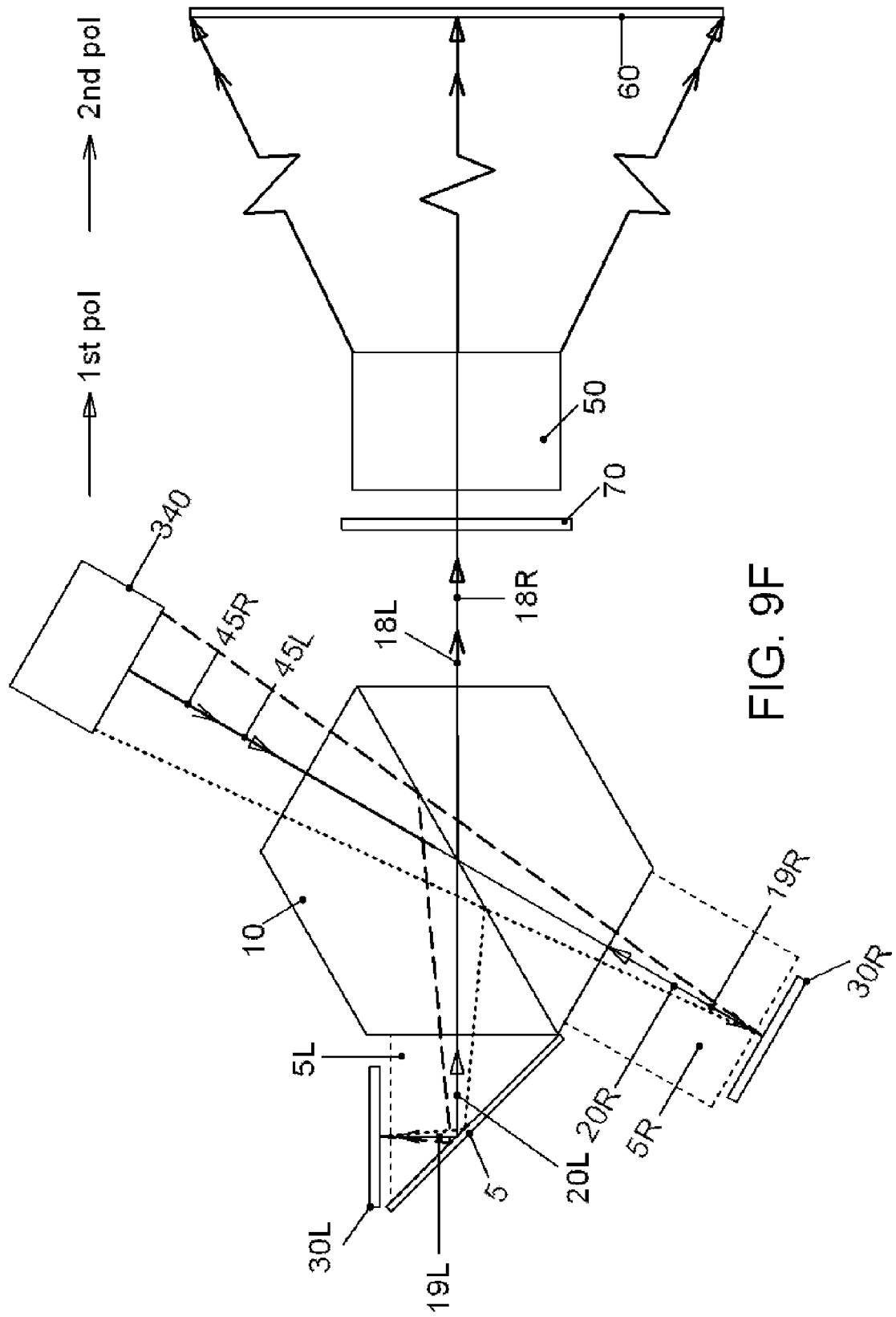
FIG. 9F is a schematic view of another second type embodiment of a dual-mode 3D projector in accordance with the present invention having two reflective micro-display panels, such as LCOS and MEM devices, a plate or prism mirror in one of the micro-display panel paths and a matching optical path or prism in the other micro-display panel path, and a polarizing beam-splitter operating at a central angle of incidence substantially greater than 45°.

In a more complicated case the images from the micro-display panel assemblies in each of the embodiments, for example, 30R and 30L in FIG. 9A, represent complete different images or video signals, for example, 30R represents a news program, and 30L represents a sports event. Viewers wearing shutter or polarizing glasses synchronized or aligned to allow only light from one micro-display panel assembly to pass will be able to see the news program but not the sports event. On the other hand, other viewers wearing shutter or polarizing glasses synchronized or aligned to allow only light from the micro-display panel assembly 30L to pass will be able to see the sports event, but not the news program. Thus, the dual-mode 3D projection display in the present invention can operate as a multiple purpose display.

It is obvious to a person skilled in the art that other color sequences and some additional common optical components, for example lens, may be needed in some of the above embodiments and these additional components are not shown in the figures. Without departing from the spirit of the present invention, other embodiments with different arrangements and layouts of the components can be used as well.

I claim:

1. Dual mode projection display apparatus, comprising: an illumination system producing first and second sub-beams with respective first and second polarizations, said first and second polarizations being orthogonal to each other, said first sub-beam comprising a first sequence of colors c11 . . . ci1 . . . cn1, said second sub-beam comprising a second sequence of colors c12 . . . ci2 . . . cn2, said first and second sequences of colors ci1 and ci2 each comprising a different sequence of primary colors, said colors ci1 and ci2, being present in respective corresponding time intervals t1$i$, t2$i$, said corresponding time intervals t1$i$, t2$i$, for each sub-beam being synchronized, for any adjacent said time intervals t1$i$, t1$i$+1, said colors c1$i$, c1$i$+1 being different, and for any adjacent said time intervals t2$i$, t2$i$+1, said colors c2$i$, c2$i$+1 being different, so that in at least one common time interval t1,2$i$, said first and second sub-beams have different colors, wherein said first and second sub-beams and said first and second polarizations in said illumination system are achieved by using different devices independently; first and second light modulators encoding first and second respective color image components I11 . . . Ii1 . . . In1 and I12 . . . Ii2 . . . In2 onto said first and second sub-beams during said common time intervals t1,2$i$ and forming respective first and second output image sub-beams having orthogonal polarizations; said first and second color image components each making-up respective first and second full-color images; a polarizing beam splitter combining said first and second output image sub-beams into an output beam; and a projection lens for projecting the output beam onto a display screen, displaying stereoscopic 3D images in at least one passive 3D mode selected from passive 3D mode with polarizing glasses and passive 3D mode with color filter glasses, and an active 3D mode with liquid crystal shutter glasses.

2. Dual mode projection display apparatus as claimed in claim 1, wherein said first and second sub-beams comprise cycled color sequences such that in each common time interval $t^{1,2}_i$, said first and second sub-beams have different colors, wherein each cycled color sequence consists of n number of said time intervals, n being greater or equal to 3.

3. Dual mode projection display apparatus as claimed in claim 1, wherein said polarizing beam splitter is selected from the group consisting of: thin film polarizing beam splitters based on interference, and thin film polarizing beam splitters based on interference plus frustrated total internal reflection, and a central angle of incidence for each of said sub-beams is $\geqq 45°$.

4. Dual mode projection display apparatus as claimed in claim 1, wherein said illumination system comprises at least two light source sub-systems providing polarized first and second color light beams, two respective polarizing converting devices for outputting first and second color light beams with polarizations switched between the said first and second polarizations time sequentially, and a color combining device for combining the color output beams from the individual polarization converting devices into a combined source beam comprising said first and second sub-beams having orthogonal polarizations.

5. Dual mode projection display apparatus as claimed in claim 1, wherein said illumination system comprises a light source sub-system providing polarized light in at least two different colors time sequentially, said light source provides at least overlapping first and second color light in any given time interval, said first and second colors are different in adjacent time intervals, and a color selective polarization converting device is provided to output said first color light with its polarization state changed to said first or second polarization and said second color light with its polarization unchanged such that said first and second sub-beams have orthogonal polarizations.

6. Dual mode projection display apparatus as claimed in claim 1, wherein said illumination system comprises a light source sub-system providing polarized white light and a color filter wheel which transmits at least two different colors in any given time interval, and which are different in adjacent time intervals, and a color selective polarization converting device is provided for outputting the first color light with its polarization state changed to said first or second polarization and the second color light with its polarization unchanged such that said first and second sub-beams have orthogonal polarizations.

7. Dual mode projection display apparatus as claimed in claim 1, wherein said first and second images represent left-eye and right-eye images and are fed to said first and second light modulators simultaneously to permit passive stereo 3D images to be displayed on a polarization preserving screen and to be viewed by wearing polarizing 3D glasses.

8. Dual mode projection display apparatus as claimed in claim 1, wherein said first and second images represent left-eye images for a first time period, and the right-eye images for a second time period to permit active stereo 3D images to be displayed on a screen and viewable through liquid crystal shutter glasses.

9. Dual mode projection display apparatus as claimed in claim 1, wherein said first and second sequences of colors represent different primary color sets, and said first and second images represent respectively left-eye images and the right-eye images, whereby passive stereo 3D images displayed on a display screen are viewable through color filter glasses.

10. Dual mode projection display apparatus as claimed in claim 1, wherein said first and second images represent identical 2D images to permit high light efficient 2D images to be displayed on a screen.

11. Dual mode projection display apparatus as claimed in claim 1, wherein said first and second light modulators are reflective light modulators, and said illumination system includes said polarizing beam splitter to split an input beam into said first and second sub-beams, said polarizing beam splitter combining said first and second output image sub-beams returned from said respective first and second light modulators into said output beam.

12. Dual mode projection display apparatus as claimed in claim 11, wherein said reflective light modulators are liquid crystal on silicon panels.

13. Dual mode projection display apparatus as claimed in claim 11, wherein said reflective light modulators are MEM device panels having associated waveplates for rotating incident light from said first polarization to said second polarization or from said second polarization to said first polarization.

14. Dual mode projection display apparatus as claimed in claim 13, wherein said polarizing beam splitter has an incident plane defined by the normal of a beam splitting surface thereof and said returned first and second image sub-beams at said beam splitting surface; said first and second light modulators are aligned so that the corresponding alignment directions of said first and second said light modulators are projected on to an output port of said polarizing beam splitter as a common alignment direction; said incident plane and said common alignment direction form an angle γ; and said polarizing beam-splitter and said first and second reflective light modulators are oriented such that the angle γ is $0° \leqq γ \leqq 45°$.

15. Dual mode projection display apparatus as claimed in claim 11, further comprising an additional mirror in front of one of said first and second light modulators.

16. Dual mode projection display apparatus as claimed in claim 1, wherein said first and second light modulators are transmissive light modulators.

17. Dual mode projection display apparatus as claimed in claim 16, further comprising a second polarizing beam splitter for producing said first and second sub-beams from a common illumination sub-system and directing them to said respective first and second transmissive light modulators.

18. Dual mode projection display apparatus as claimed in claim 16, wherein said transmissive light modulators are liquid crystal panels.

19. Dual mode projection display apparatus as claimed in claim 1, wherein said first and second images represent two independent images that can be seen by different viewers where both viewers' eyes have identical suitable glasses made of polarizing glasses, color filter glasses or liquid crystal shutter glasses to permit only one of the independent images to be seen.

20. Dual mode projection display apparatus comprising: an illumination system producing first and second sub-beams with respective first and second polarizations, said first and second polarizations being orthogonal to each other, said first sub-beam comprising a first sequence of colors c11 . . . ci1 . . . cn1, said second sub-beam comprising a second sequence of colors c12 . . . ci2 . . . cn2, said first and second sequences of colors ci1 and ci2 each comprising a different sequence of primary colors, said colors ci1 and ci2, being present in respective corresponding time intervals t1$i$, t2$i$, said corresponding time intervals t1$i$, t2$i$, for each sub-beam being synchronized, for any adjacent said time intervals t1$i$, t1$i$+1, said colors c1$i$, c1$i$+1 being different, and for any adjacent said time intervals t2$i$, t2$i$+1, said colors c2$i$, c2$i$+1 being different, so that in at least one common time interval t1,2$i$, said first and second sub-beams have different colors, wherein said first and second sub-beams and said first and second polarizations in said illumination system are achieved by using different devices independently; a polarizing beam splitter separating said first and second sub-beams; first and second reflective light modulators encoding first and second respective color image components I11 . . . Ii1 . . . In1 and I12 . . . Ii2 . . . In2 onto said first and second sub-beams during said common time intervals t1,2$i$ and forming respective first and second output image sub-beams having orthogonal polarizations;

said first and second color image components each making-up respective first and second full-color images; said first and second light modulators returning said first and second output sub-beams to said polarizing beam splitter; said polarizing beam splitter combining said first and second output sub-beams into an output beam; and a projection lens for projecting the output beam onto a display screen, displaying stereoscopic 3D images in at least one passive 3D mode selected from passive 3D mode with polarizing glasses and passive 3D mode with color filter glasses, and an active 3D mode with liquid crystal shutter glasses.

21. Dual mode projection display apparatus as claimed in claim 20, wherein said polarizing beam splitter has an incident plane defined by the normal of a beam splitting surface thereof and said returned image sub-beams at said beam splitting surface; said first and second light modulators are aligned so that the corresponding alignment directions of said first and second said light modulators are projected on to an output port of said polarizing beam splitter as a common alignment direction; said incident plane and said common alignment direction form an angle $\gamma$; and said polarizing beam-splitter and said first and second reflective light modulators are oriented such that the angle $\gamma$ is $0°\leq\gamma\leq45°$.

22. Dual mode projection display apparatus as claimed in claim 20, wherein said first and second images represent two independent images that can be seen by different viewers where both viewers' eyes have identical suitable glasses made of polarizing glasses, color filter glasses or liquid crystal shutter glasses to permit only one of the independent images to be seen.

23. Dual mode projection display apparatus comprising: an illumination system producing first and second sub-beams with respective first and second polarizations, said first and second polarizations being orthogonal to each other, said first sub-beam comprising a first sequence of colors c11 . . . ci1 . . . cn1, said second sub-beam comprising a second sequence of colors c12 . . . ci2 . . . cn2, said first and second sequences of colors ci1 and ci2 each comprising a different sequence of primary colors, said colors ci1 and ci2, being present in respective corresponding time intervals t1$i$, t2$i$, said corresponding time intervals t1$i$, t2$i$, for each sub-beam being synchronized, for any adjacent said time intervals t1$i$, t1$i$+1, said colors c1$i$, c1$i$+1 being different, and for any adjacent said time intervals t2$i$, t2$i$+1, said colors c2$i$, c2$i$+1 being different, so that in at least one common time interval t1,2$i$, said first and second sub-beams have different colors, wherein said first and second sub-beams and said first and second polarizations in said illumination system are achieved by using different devices independently; a first polarizing beam splitter separating said first and second sub-beams; first and second transmissive light modulators encoding first and second respective color image components I11 . . . Ii1 . . . In1 and I12 . . . Ii2 . . . In2 onto said first and second sub-beams during said common time intervals t1,2$i$ and forming respective first and second output image sub-beams having orthogonal polarizations; said first and second color image components making-up respective first and second full-color images; a second polarizing beam splitter combining said first and second output image sub-beams carrying said first and second image components into an output beam; and a projection lens for projecting the output beam onto a display screen, displaying stereoscopic 3D images in at least one passive 3D mode selected from passive 3D mode with polarizing glasses and passive 3D mode with color filter glasses, and an active 3D mode with liquid crystal shutter glasses.

24. Dual mode projection display apparatus as claimed in claim 23, wherein said first and second images represent two independent images that can be seen by different viewers where both viewers' eyes have identical suitable glasses made of polarizing glasses, color filter glasses or liquid crystal shutter glasses to permit only one of the independent images to be seen.

25. A method of displaying images on a display screen comprising: producing first and second sub-beams with respective first and second polarizations, said first and second polarizations being orthogonal to each other, said first sub-beam comprising a first sequence of colors c11 . . . ci1 . . . cn1, said second sub-beam comprising a second sequence of colors c12 . . . ci2 . . . cn2, said first and second sequences of colors ci1 and ci2 each comprising a different sequence of primary colors, said colors ci1 and ci2, being present in respective corresponding time intervals t1$i$, t2$i$, said corresponding time intervals t1$i$, t2$i$, for each sub-beam being synchronized, for any adjacent said time intervals t1$i$, t1$i$+1, said colors c1$i$, c1$i$+1 being different, for any adjacent said time intervals t2$i$, t2$i$+1, said colors c2$i$, c2$i$+1 being different, so that in at least one common time interval t1,2$i$, said first and second sub-beams have different colors wherein said first and second sub-beams and said first and second polarizations in said illumination system are achieved by using different devices independently; encoding first and second respective color image components I11 . . . Ii1 . . . In1 and I12 . . . Ii2 . . . In2 onto said first and second sub-beams during said common time intervals t1,2$i$ and forming respective first and second output image sub-beams having orthogonal polarizations; said first and second color image components each making-up respective first and second full-color images; combining said first and second output image sub-beams into an output beam; and projecting the output beam onto the display screen, displaying stereoscopic 3D images in at least one passive 3D mode selected from passive 3D mode with polarizing glasses and passive 3D mode with color filter glasses, and an active 3D mode with liquid crystal shutter glasses.

26. A method as claimed in claim 25, wherein said first and second sub-beams comprise cycled color sequences such that in each common time interval $t^{1,2}_i$, said first and second sub-beams have different colors.

* * * * *